United States Patent
Noguchi

(10) Patent No.: US 7,664,486 B2
(45) Date of Patent: Feb. 16, 2010

(54) SERVER, MOBILE TERMINAL, AND SERVICE METHOD

(75) Inventor: Yukinori Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 488 days.

(21) Appl. No.: 11/148,230

(22) Filed: Jun. 9, 2005

(65) Prior Publication Data

US 2005/0277405 A1 Dec. 15, 2005

(30) Foreign Application Priority Data

Jun. 9, 2004 (JP) ............................. 2004-171335

(51) Int. Cl.
*H04M 1/66* (2006.01)
(52) U.S. Cl. ........................ 455/411; 455/406; 455/408; 455/420
(58) Field of Classification Search ................. 455/410, 455/411, 406, 408, 420; 713/168
See application file for complete search history.

(56) References Cited

U.S. PATENT DOCUMENTS

| | | | |
|---|---|---|---|
| 5,621,794 A * | 4/1997 | Matsuda et al. | 380/217 |
| 5,832,119 A * | 11/1998 | Rhoads | 382/232 |
| 6,185,000 B1 * | 2/2001 | Shiota et al. | 358/1.18 |
| 6,324,521 B1 * | 11/2001 | Shiota et al. | 705/27 |
| 6,385,596 B1 * | 5/2002 | Wiser et al. | 705/51 |
| 6,434,579 B1 * | 8/2002 | Shaffer et al. | 715/209 |
| 6,448,979 B1 * | 9/2002 | Schena et al. | 715/741 |
| 6,625,812 B2 * | 9/2003 | Abrams et al. | 725/105 |
| 6,657,702 B1 * | 12/2003 | Chui et al. | 355/40 |
| 6,690,843 B1 * | 2/2004 | Squilla et al. | 382/306 |
| 6,741,864 B2 * | 5/2004 | Wilcock et al. | 455/456.1 |
| 6,961,561 B2 * | 11/2005 | Himmel et al. | 455/419 |
| 6,980,964 B1 * | 12/2005 | Cocotis et al. | 705/26 |

(Continued)

FOREIGN PATENT DOCUMENTS

JP 2002-118680 A 4/2002

OTHER PUBLICATIONS

Yoshiko Miyaguchi, et al., "Development and the Vallidation of MediaStick System," Apr. 1, 2001-Mar. 31, 2002, pp. 1-9.

*Primary Examiner*—Charles N Appiah
*Assistant Examiner*—Kwasi Karikari
(74) *Attorney, Agent, or Firm*—Sughrue Mion, PLLC

(57) ABSTRACT

The server which provides at least one of an image and additional information of the image via a network to a mobile terminal of an access source when access is received from the mobile terminal via the network using access information recorded together with the image on a prescribed print medium, the server comprises: an encrypting device which encrypts identification information corresponding to the image; an access information generating device which generates the access information containing a plain text URL required for access to the server and the encrypted identification information; a print instruction information creating device which creates instruction information that the access information is recorded together with the image onto a print medium by a prescribed printer; a receiving device which receives the encrypted identification information contained in the access information from the mobile terminal when the access information recorded on the print medium is inputted to the mobile terminal; a decrypting device which decrypts the encrypted identification information that is received; and a transmitting device which transmits at least one of the image and the additional information of the image that correspond to the decrypted identification information to the mobile terminal.

17 Claims, 15 Drawing Sheets

U.S. PATENT DOCUMENTS

| | | | |
|---|---|---|---|
| 6,985,875 B1 * | 1/2006 | Wolf | 705/26 |
| 7,051,019 B1 * | 5/2006 | Land et al. | 707/4 |
| 7,103,357 B2 * | 9/2006 | Kirani et al. | 455/426.1 |
| 7,154,621 B2 * | 12/2006 | Rodriguez et al. | 358/1.15 |
| 7,350,236 B1 * | 3/2008 | Silverbrook et al. | 726/26 |
| 7,355,759 B1 * | 4/2008 | Kokusho | 358/440 |
| 7,474,759 B2 * | 1/2009 | Sternberg et al. | 382/100 |
| 2002/0147661 A1 * | 10/2002 | Hatakama et al. | 705/26 |
| 2004/0008263 A1 * | 1/2004 | Sayers et al. | 348/207.11 |
| 2006/0170669 A1 * | 8/2006 | Walker et al. | 345/418 |

* cited by examiner

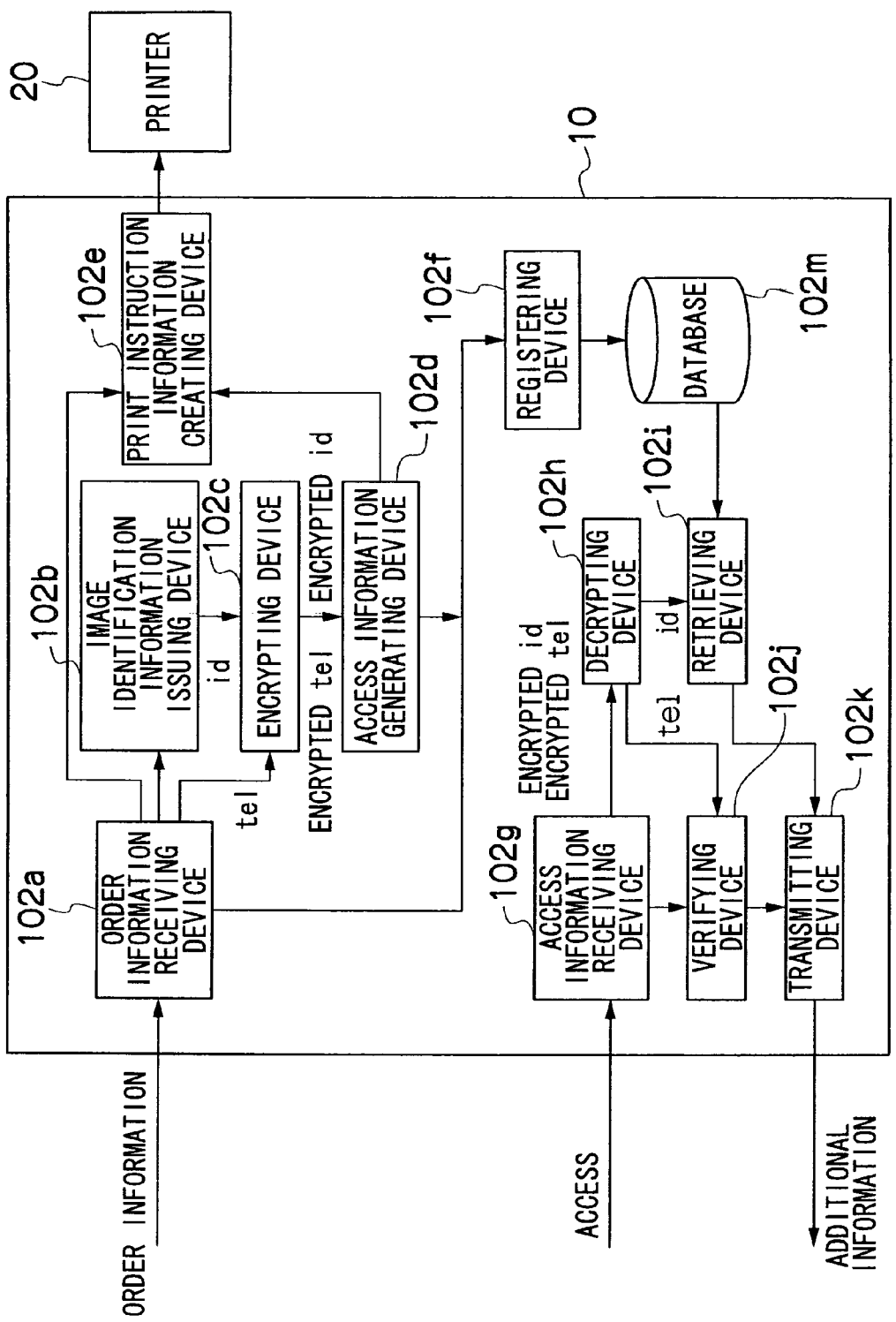

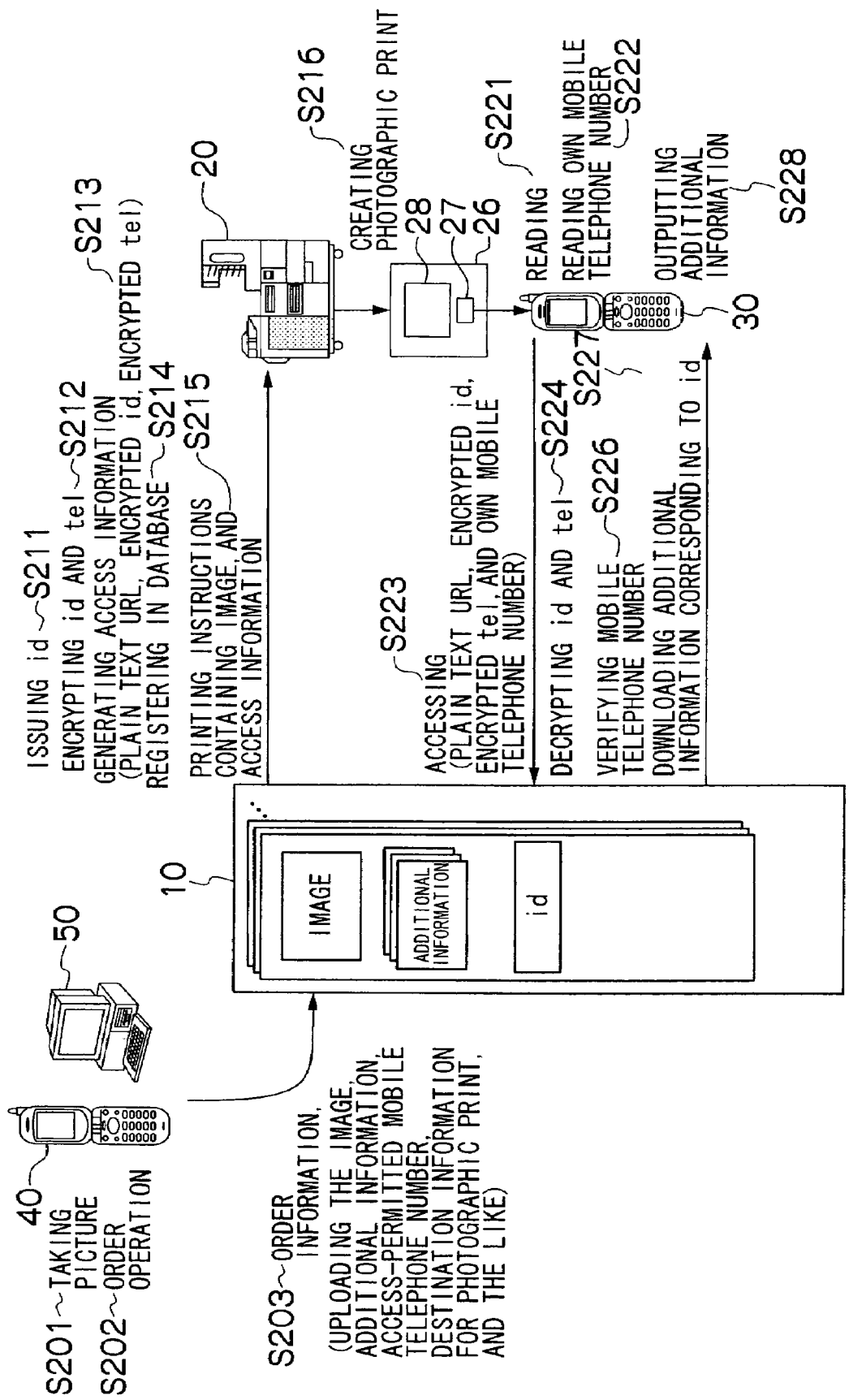

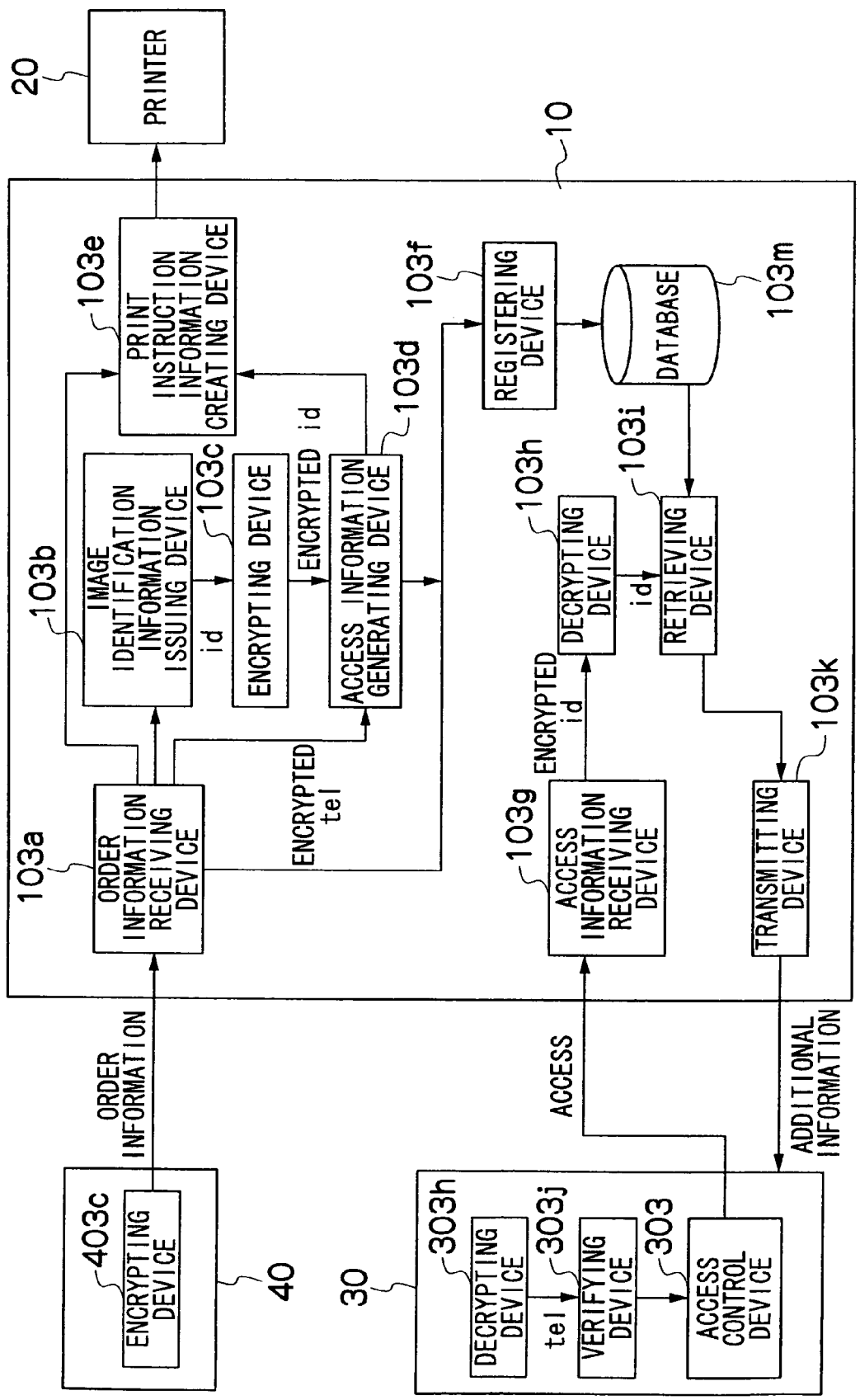

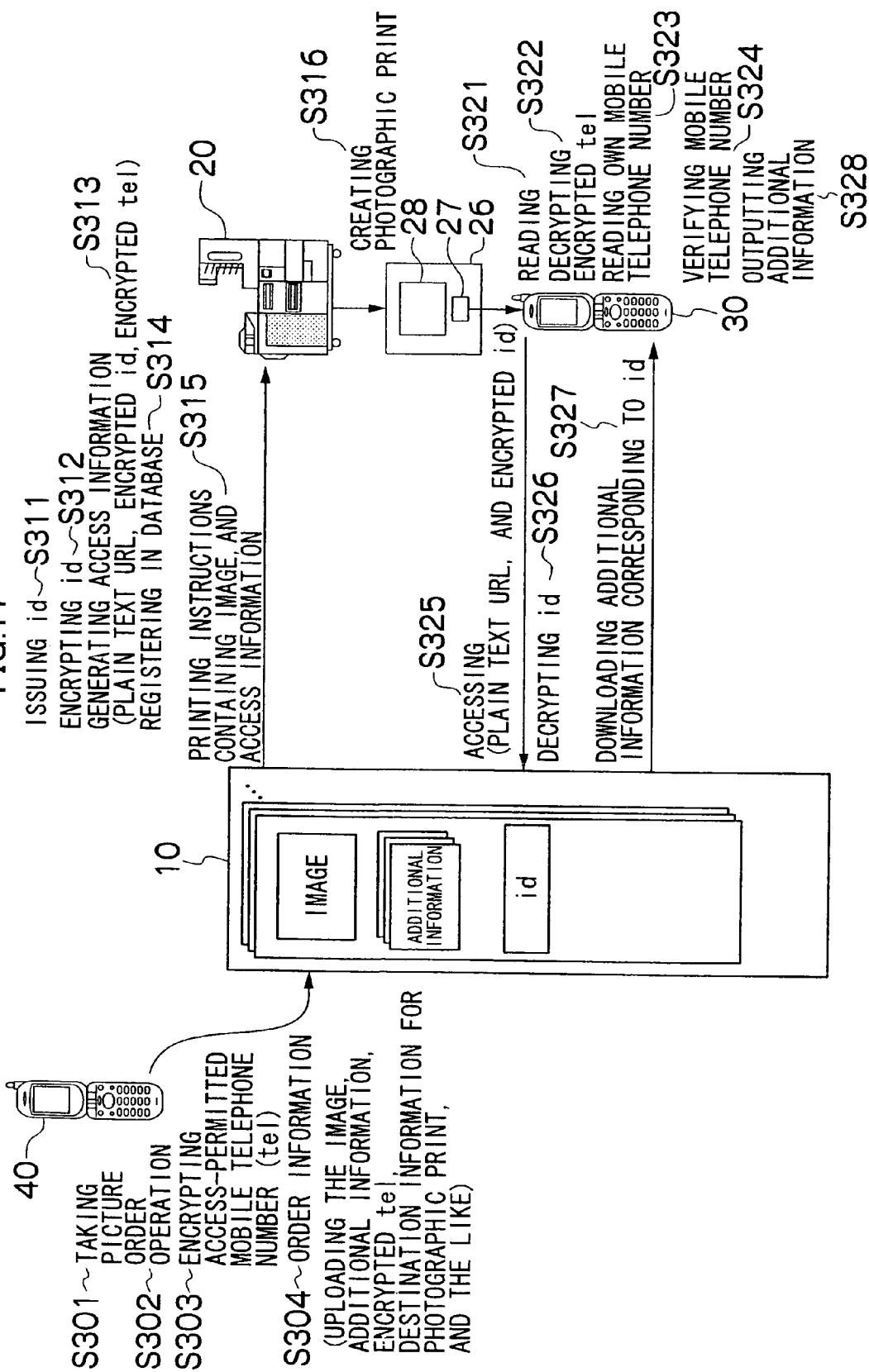

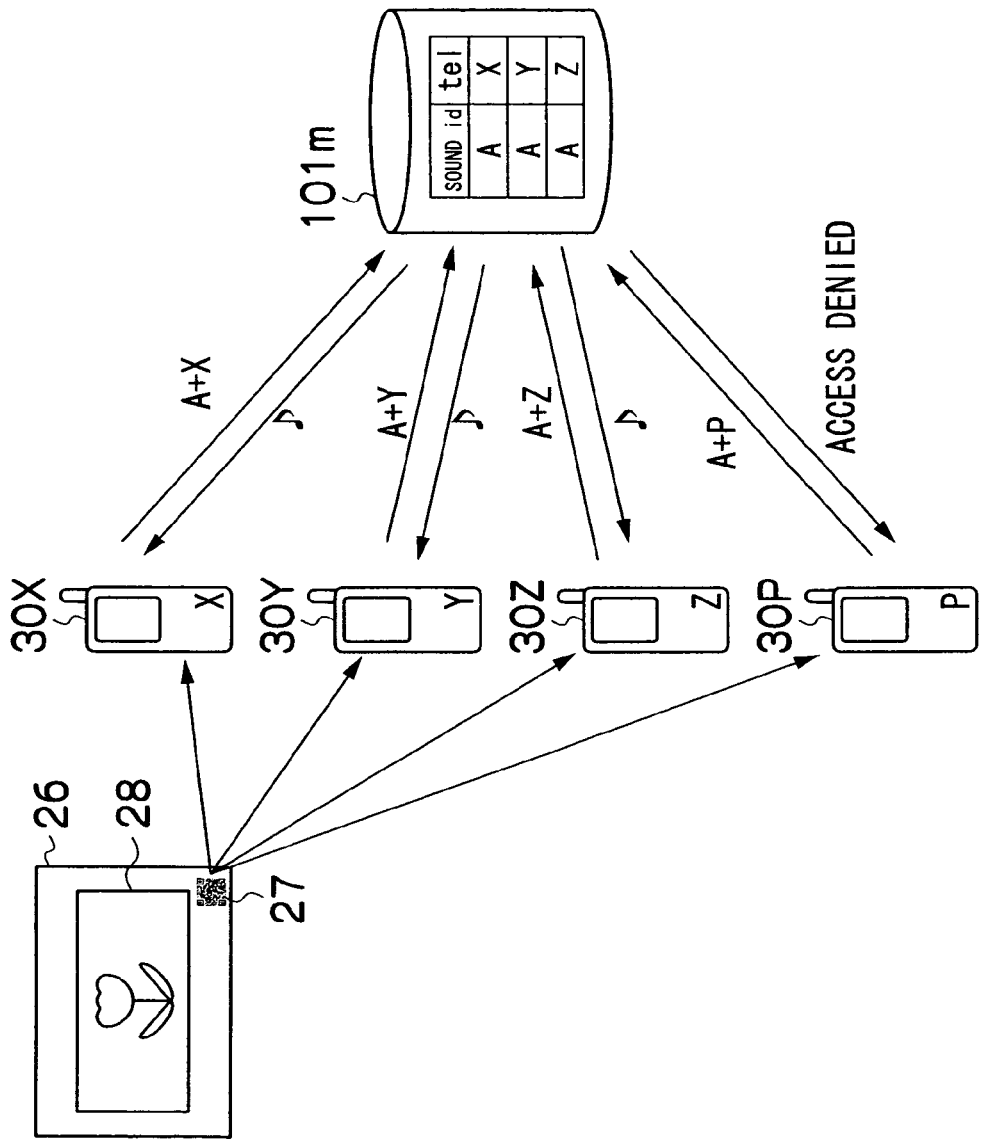

SERVER, MOBILE TERMINAL, AND SERVICE METHOD

BACKGROUND OF THE INVENTION

1. Field of the Invention

The present invention relates to a server, a mobile terminal, and a service method, and more particularly to a server, a mobile terminal, and a service method which provide at least one of an image and additional information of the image via a network.

2. Description of the Related Art

Conventionally, it is known that a general user can easily obtain the detailed information of the advertisement on a network by using a mobile telephone for reading the two-dimensional code such as a QR code (registered trademark) printed on an distributed advertising medium (see Japanese Patent Application Publication No. 2002-118680, for example).

For example, while detailed information which expounds commodity functions and the like is registered in advance in a server on a network, an advertising medium that simple highly visible information such as the product name, catch copy, and the like is printed together with a two-dimensional code is distributed to a general user. A URL (Uniform Resource Locator) for acquiring the detailed information registered in the server is encrypted in a prescribed format in the two-dimensional code. When a general user reads the two-dimensional code using a mobile telephone, the two-dimensional code is decoded by the mobile telephone, and then the decoded result (URL) is displayed on the mobile telephone screen. When the general user performs an operation for permitting communication by the mobile telephone, the mobile telephone accesses the server using the URL displayed on the screen thereof, and then detailed information relating to the advertisement downloaded from the server is displayed on the screen of the mobile telephone.

In addition, it is proposed for distributing a paper medium such as catalog which is printed a two-dimensional code containing information necessary for electronic commerce; reading the two-dimensional code printed on the paper medium by using a prescribed mobile terminal; merging the read information with personal information stored previously in the mobile terminal; and then transmitting the merged information. Therefore, access of product information, purchasing, reservation, payment, and the like can be performed on a network without the use of a keyboard (see "Development and Validation of Media Stick System" Yoshiko Miyauchi, Takafumi Nakanishi, and Takashi Kitagawa, pp. 1-2, FIG. 1, 1086740537156_0.pdf).

However, in the above system, there is a problem in which information can be acquired from the server by a third party even when the information is meant to be provided only to a specific user.

More specifically, for example, when a photographic print A printing access information which is capable for acquiring information to be provided to a Person A is delivered to the Person A, the Person A can acquire information that is addressed to the Person A from the server by inputting the access information printed on the photographic print A into the mobile telephone of Person A. Herein, if the Person A could guess another person's access information from the result of observing his own access information displayed on the mobile telephone screen when Person A accesses the server, there is a problem that the Person A may gain the other person's information by inputting into the mobile telephone the guessed other person's access information.

Incidentally, when the Internet is used, a URL composed of a communication protocol name (for example, "http (Hyper Text Transfer Protocol)") and the domain name of a server is generally used. The communication protocol name and server domain name are the minimum amount of information necessary for connecting to the server. If all of the access information containing the communication protocol name and the server domain name were encrypted uniformly using a previous encoding technique, it is possible to prevent gaining information addressed to others fraudulently to the mobile telephones which are incapable of decoding a cryptogram. However, it may become impossible to connect to the server. In other words, authorized access of information may also be disabled.

SUMMARY OF THE INVENTION

The present invention is contrived in view of such circumstances, and an object thereof is to provide a server, a mobile terminal, and a service method that a specific user can acquire information that is meant to be provided to the user while preventing an unauthorized user from gaining the information.

In order to attain the aforementioned object, the present invention is directed to a server which provides at least one of an image and additional information of the image via a network to a mobile terminal of an access source when access is received from the mobile terminal via the network using access information recorded together with the image on a prescribed print medium, the server comprising: an encrypting device which encrypts identification information corresponding to the image; an access information generating device which generates the access information containing a plain text URL required for access to the server and the encrypted identification information; a print instruction information creating device which creates instruction information that the access information is recorded together with the image onto a print medium by a prescribed printer; a receiving device which receives the encrypted identification information contained in the access information from the mobile terminal when the access information recorded on the print medium is inputted to the mobile terminal; a decrypting device which decrypts the encrypted identification information that is received; and a transmitting device which transmits at least one of the image and the additional information of the image that correspond to the decrypted identification information to the mobile terminal.

According to the present invention, the identification information corresponding to an image onto a print medium is recorded in encrypted fashion. Therefore, even if the access information has been read by a device that is capable of displaying the access information, the identification information is displayed in code, for which reason the access information for acquiring information addressed to a third party becomes difficult to guess, so that the user to whom the photographic print is distributed has access only to the information that is meant to be provided to that user. In addition, since the URL portion is in plain text, the service can be received by accessing the server even if the mobile terminal is not capable of code decryption.

In order to attain the aforementioned object, the present invention is also directed to a server which provides at least one of an image and additional information of the image via a network to a mobile terminal of an access source when access is received from the mobile terminal via the network using access information recorded together with the image on a prescribed print medium, the server comprising: a registering device which registers a terminal identifier of a mobile terminal having an access permission for each of images in association with identification information that corresponds to the image into a prescribed database; an access information generating device which generates the access information containing the identification information; a print instruction information creating device which creates instruction information that the generated access information is recorded together with the image onto a print medium by a prescribed printer; a receiving device which receives the identification information contained in the access information and a terminal identifier stored in advance in the mobile terminal from the mobile terminal, when the access information recorded on the print medium is inputted to the mobile terminal; a retrieving device which retrieves the terminal identifier that is associated with the received identification information from the database; a verifying device which verifies the retrieved terminal identifier against the terminal identifier received from the mobile terminal; and a transmitting device which transmits at least one of the image and the additional information of the image corresponding to the received identification information to the mobile terminal if the verifying device verifies the retrieved terminal identifier against the terminal identifier received from the mobile terminal, and denies the access from the mobile terminal if the verifying device does not verify the retrieved terminal identifier against the terminal identifier received from the mobile terminal.

According to the present invention, the terminal identifier of the mobile terminal which includes access permission registered in the database in association with the identification information is verified against the terminal identifier of the mobile terminal that has actually performed access using the access information on the print medium, and then at least one of the image and additional information is provided only when both terminal identifiers match. Therefore, it is possible to prevent a third party from accessing at least one of the image and the additional information that are meant to be provided to a specific user.

In order to attain the aforementioned object, the present invention is also directed to a server which provides at least one of an image and additional information of the image via a network to a mobile terminal of an access source when access is received from the mobile terminal via the network using access information recorded together with the image on a prescribed print medium, the server comprising: a registering device which registers a terminal identifier of the mobile terminal having an access permission for each of images in association with identification information that corresponds to the image into a prescribed database; an access information generating device which generates the access information containing an encrypted identification information and a plain text URL required for connecting to the server; a print instruction information creating device which creates instruction information that the access information containing the plain text URL and the encrypted identification information is recorded together with the image onto a print medium by a prescribed printer; a receiving device which receives the encrypted identification information and the terminal identifier stored in advance in the mobile terminal from the mobile terminal, when the access information recorded on the print medium is inputted to the mobile terminal; a decrypting device which decrypts the encrypted identification information that is received; a retrieving device which retrieves the terminal identifier that is associated with decrypted the identification information from the database; a verifying device which verifies the retrieved terminal identifier against the terminal identifier received from the mobile terminal; and a transmitting device which transmits at least one of the image and the additional information of the image corresponding to the decrypted identification information to the mobile terminal if the verifying device verifies the retrieved terminal identifier against the terminal identifier received from the mobile terminal, and denies the access from the mobile terminal if the verifying device does not verify the retrieved terminal identifier against the terminal identifier received from the mobile terminal.

According to the present invention, the terminal identifier of the mobile terminal which has access permission registered in the database in association with the identification information is verified against the terminal identifier of the mobile terminal that has actually performed access using the access information on the print medium, and then at least one of the image and the additional information is provided only when both terminal identifiers match. Therefore, it is possible to prevent a third party from accessing at least one of the image and the additional information that are meant to be provided to a specific user. In addition, the identification information corresponding to an image onto a print medium is recorded in encrypted fashion. Therefore, since the identification information is displayed in code, it is difficult to guess the access information for acquiring information addressed to a third party even if the access information is read by a device that is capable of displaying the access information, so that the user to whom the photographic print is distributed has access only to the information that are meant to be provided to that user. Furthermore, since the URL portion is in plain text, the server can be accessed and the service received even if the mobile terminal is not capable of code decryption.

In order to attain the aforementioned object, the present invention is also directed to a server which provides at least one of an image and additional information of the image via a network to a mobile terminal of an access source when access is received from the mobile terminal via the network using access information recorded together with the image on a prescribed print medium, the server comprising: an access information generating device which generates the access information containing an encrypted terminal identifier of the mobile terminal that has an access permission for each of images; a print instruction information creating device which creates instruction information whereby the access information thus generated is recorded by a prescribed printer together with the image onto a print medium; a receiving device which receives the access information that includes the encrypted terminal identifier and the terminal identifier, which is stored in advance in the mobile terminal from the mobile terminal, when the access information recorded on the print medium is inputted to the mobile terminal; a decrypting device which decrypts the encrypted terminal identifier; a verifying device which verifies the decrypted terminal identifier against the terminal identifier stored in advance in the mobile terminal; and a transmitting device which transmits at least one of the image and the additional information of the image to the mobile terminal according to the access information if the verifying device verifies the decrypted terminal identifier against the terminal identifier stored in advance in the mobile terminal, and denies access from the mobile terminal if the verifying device does not verify the decrypted terminal identifier against the terminal identifier stored in advance in the mobile terminal.

According to the present invention, the terminal identifier of the mobile terminal which has access permission is verified against the terminal identifier of the mobile terminal that has actually performed access using the access information on the print medium, and then at least one of the image and additional information is provided only when both terminal identifiers match. Therefore, it is possible to prevent a third party from accessing the image and the additional information that are meant to be provided to a specific user. In addition, it becomes unnecessary for the server to store the terminal identifier of the mobile terminal having access permission.

In order to attain the aforementioned object, the present invention is also directed to a server which provides at least one of an image and additional information of the image via a network to a mobile terminal of an access source when access is received from the mobile terminal via the network using access information recorded together with the image on a prescribed print medium, the server comprising: an access information generating device which generates the access information containing an encrypted terminal identifier of the mobile terminal that has an access permission for each of images; a print instruction information creating device which creates instruction information that the generated access information is recorded together with the image onto a print medium by a prescribed printer; a receiving device which receives the access from the mobile terminal using the access information if the encrypted terminal identifier contained in the access information is decrypted by the mobile terminal, while the decrypted terminal identifier matches the terminal identifier stored in advance in the mobile terminal if the access information recorded on the print medium is inputted to the mobile terminal; and a transmitting device which transmits at least one of the image and the additional information of the image to the mobile terminal according to the access information.

According to the present invention, the terminal identifier of the mobile terminal which has access permission is verified against the terminal identifier of the mobile terminal that has actually performed the access using the access information on the print medium, and then at least one of the image and the additional information is provided only when both terminal identifiers match. Therefore, it is possible to prevent third party from accessing at least one of the image and the additional information that are meant to be provided to a specific user. In addition, it becomes unnecessary for the server to store the terminal identifier of the mobile terminal having access permission. Furthermore, the terminal identifier of the mobile terminal having access permission is verified against the terminal identifier of the mobile terminal that has actually performed access using the access information on the print medium, and then the server is accessed only when both terminal identifiers match, so that redundant communication can be eliminated.

The present invention is also directed to the server wherein: the registering device registers in the database a list associating a plurality of terminal identifiers with one piece of the identification information; the retrieving device retrieves from the database the list corresponding to the identification information received from the mobile terminal; the verifying device judges whether or not the terminal identifier received from the mobile terminal is contained in the list retrieved by the retrieving device; and the transmitting device transmits at least one of the image and the additional information to the mobile terminal only if the terminal identifier received from the mobile terminal is contained in the list.

The present invention is also directed to the server wherein: the access information generating device generates access information containing a list which associates a plurality of terminal identifiers with one piece of the identification information; the print instruction information creating device creates instruction information whereby the access information containing the list is recorded onto the print medium together with the image; the verifying device judges whether or not the terminal identifier received from the mobile terminal, which is the terminal identifier stored in advance in the mobile terminal, is contained in the list which is received from the mobile terminal and which has been recorded onto the print medium; and the transmitting device transmits at least one of the image and the additional information to the mobile terminal only if the terminal identifier stored in advance in the mobile terminal is contained in the list.

The present invention is also directed to the server wherein: the access information generating device generates access information containing a list which associates one terminal identifier with one piece of the identification information; the print instruction information creating device creates instruction information whereby the access information containing the list is recorded onto the print medium together with the image; the receiving device receives the access information from the mobile terminal, if the terminal identifier stored in advance in the mobile terminal is contained in the list recorded on the print medium; and the transmitting device transmits at least one of the image and the additional information to the mobile terminal, if the access information is received from the mobile terminal.

The present invention is also directed to the server wherein: if the transmitting device denies the access from the mobile terminal, then the registering device performs a setting whereby access from the mobile terminal that has been denied access is permitted, by registering in the database the terminal identifier of the mobile terminal in association with the identification information.

In order to attain the aforementioned object, the present invention is directed to a mobile terminal, wherein: the server as described above is accessed; and at least one of the image and the additional information is received and reproduced from the server.

In order to attain the aforementioned object, the present invention is also directed to a mobile terminal which accesses a prescribed server via a network, using access information recorded together with an image onto a prescribed print medium, and which receives and reproduces at least one of the image and additional information of the image from the server; comprising: an input device which inputs the access information containing an encrypted text of a terminal identifier of the mobile terminal that access is permitted corresponding to the image; a decrypting device which decrypts the encrypted text of the terminal identifier contained in the access information; a storage device which stores the terminal identifier of the mobile terminal; a verifying device which verifies the terminal identifier decrypted by the decrypting device against the terminal identifier stored in the storage device; and an access control device which performs control whereby the server is accessed by using the access information if the verifying device verifies the terminal identifier decrypted by the decrypting device against the terminal identifier stored in the storage device, while the server is not accessed if the verifying device does not verify the terminal identifier decrypted by the decrypting device against the terminal identifier stored in the storage device.

The present invention is also directed to the mobile terminal wherein: access information containing a list which associates one terminal identifier with one piece of the identification information is input to the input device; the verifying device judges whether or not the terminal identifier stored in advance in the storage device is contained in the list; and the access control device performs control whereby the server is accessed only if the terminal identifier stored in advance in the storage device is contained in the list.

The present invention is also directed to the mobile terminal wherein the access control device requests access permission to the server if the server denies the access.

In order to attain the aforementioned object, the present invention is directed to a service method for providing at least one of an image and additional information of the image via a network from a server to a mobile terminal of an access source when the server is accessed from the mobile terminal via the network using access information recorded together with the image on a prescribed print medium; the service method comprising the steps of: encrypting identification information corresponding to the image by the server; generating by the server the access information which includes a plain text URL, which is required for access via the network, and the encrypted identification information; recording the access information together with the image onto a print medium by a prescribed printer; transmitting the encrypted identification information contained in the access information from the mobile terminal to the server when the access information recorded on the print medium is inputted to the mobile terminal; decrypting the received encrypted identification information by the server; and transmitting at least one of the image and the additional information of the image corresponding to the decrypted identification information to the mobile terminal by the server.

In order to attain the aforementioned object, the present invention is also directed to a service method for providing at least one of an image and additional information of the image via a network from a server to a mobile terminal of an access source when the server is accessed from the mobile terminal via the network using access information recorded together with the image on a prescribed print medium, the service method comprising the steps of: registering by the server a terminal identifier of the mobile terminal having an access permission for each of images in a prescribed database in association with identification information that corresponds to the image; generating by the server the access information containing the identification information; recording the access information together with the image onto a print medium by a prescribed printer; transmitting the identification information contained in the access information and the terminal identifier stored in advance in the mobile terminal from the mobile terminal to the server when the access information recorded on the print medium is inputted to the mobile terminal; retrieving from the database the terminal identifier that is associated with the identification information received by the server; verifying by the server the retrieved terminal identifier against the terminal identifier which is received from the mobile terminal; and transmitting by the server at least one of the image and the additional information of the image corresponding to the received identification information to the mobile terminal if the retrieved terminal identifier is verified against the terminal identifier which is received from the mobile terminal.

In order to attain the aforementioned object, the present invention is also directed to a service method for providing at least one of an image and additional information of the image via a network from a server to a mobile terminal of an access source when the server is accessed from the mobile terminal via the network using access information recorded together with the image on a prescribed print medium, the service method comprising the steps of: registering by the server a terminal identifier of the mobile terminal having an access permission for each of images in a prescribed database in association with identification information that corresponds to the image; generating by the server the access information containing the encrypted identification information and a plain text URL required for connecting to the server; recording the access information containing the plain text URL and the encrypted identification information together with the image onto a print medium by a prescribed printer; transmitting the encrypted identification information and the terminal identifier stored in advance in the mobile terminal from the mobile terminal to the server when the access information recorded on the print medium is inputted to the mobile terminal; decrypting by the server the received encrypted identification information; retrieving by the server from the database the terminal identifier that is associated with the decrypted identification information; verifying by the server the retrieved terminal identifier against the terminal identifier which is received from the mobile terminal; and transmitting by the server at least one of the image and the additional information of the image corresponding to the decrypted identification information to the mobile terminal if the retrieved terminal identifier is verified against the terminal identifier which is received from the mobile terminal.

In order to attain the aforementioned object, the present invention is also directed to a service method for providing at least one of an image and additional information of the image via a network from a server to a mobile terminal of an access source when the server is accessed from the mobile terminal via the network using access information recorded together with the image on a prescribed print medium, the service method comprising the steps of: generating by the server the access information containing an encrypted terminal identifier of the mobile terminal, that has an access permission for each of images; recording the access information together with the image onto a print medium by a prescribed printer; transmitting the access information which includes the encrypted terminal identifier and the terminal identifier, which is stored in advance in the mobile terminal from the mobile terminal to the server when the access information recorded on the print medium is inputted to the mobile terminal; decrypting the encrypted terminal identifier by the server; verifying by the server the decrypted terminal identifier against the terminal identifier which is stored in advance in the mobile terminal; and transmitting at least one of the image and the additional information of the image according to the access information by the server to the mobile terminal if the decrypted terminal identifier is verified against the terminal identifier which is stored in advance in the mobile terminal.

In order to attain the aforementioned object, the present invention is also directed to a service method for providing at least one of an image and additional information of the image via a network from a server to a mobile terminal of an access source when the server is accessed from the mobile terminal via the network using access information recorded together with the image on a prescribed print medium, the service method comprising the steps of: generating by the server the access information containing an encrypted terminal identifier of the mobile terminal that has an access permission for each of images; recording the access information together with the image onto a print medium by a prescribed printer; decrypting the encrypted terminal identifier contained in the access information by the mobile terminal when the access information recorded on the print medium is inputted to the mobile terminal; verifying by the mobile terminal the decrypted terminal identifier against the terminal identifier which is stored in advance in the mobile terminal; accessing from the mobile terminal to the server by using the access information if the decrypted terminal identifier is verified against the terminal identifier which is stored in advance in the mobile terminal; and transmitting by the server at least one of the image and the additional information of the image to the mobile terminal according to the access information.

As described above, according to the present invention, it is possible for the specific user to acquire information that is meant to be provided to the user, while preventing an unauthorized user from gaining information of the specific user.

BRIEF DESCRIPTION OF THE DRAWINGS

The nature of this invention, as well as other objects and advantages thereof, will be explained in the following with retrieve to the accompanying drawings, in which like retrieve characters designate the same or similar parts throughout the figures and wherein:

FIG. 8 is a schematic block diagram showing the configuration of the server according to a second embodiment of the present invention;

FIG. 9 is a diagram showing a sequence of service processing according to the second embodiment;

FIG. 10 is a schematic block diagram showing a configuration of a server according to a third embodiment of the present invention;

FIG. 11 is a diagram showing a sequence of service processing according to the third embodiment;

FIG. 12 is a diagram showing a part of the sequence of service processing when access is permitted from a plurality of mobile telephones;

DETAILED DESCRIPTION OF THE PREFERRED EMBODIMENTS

Figure 1:
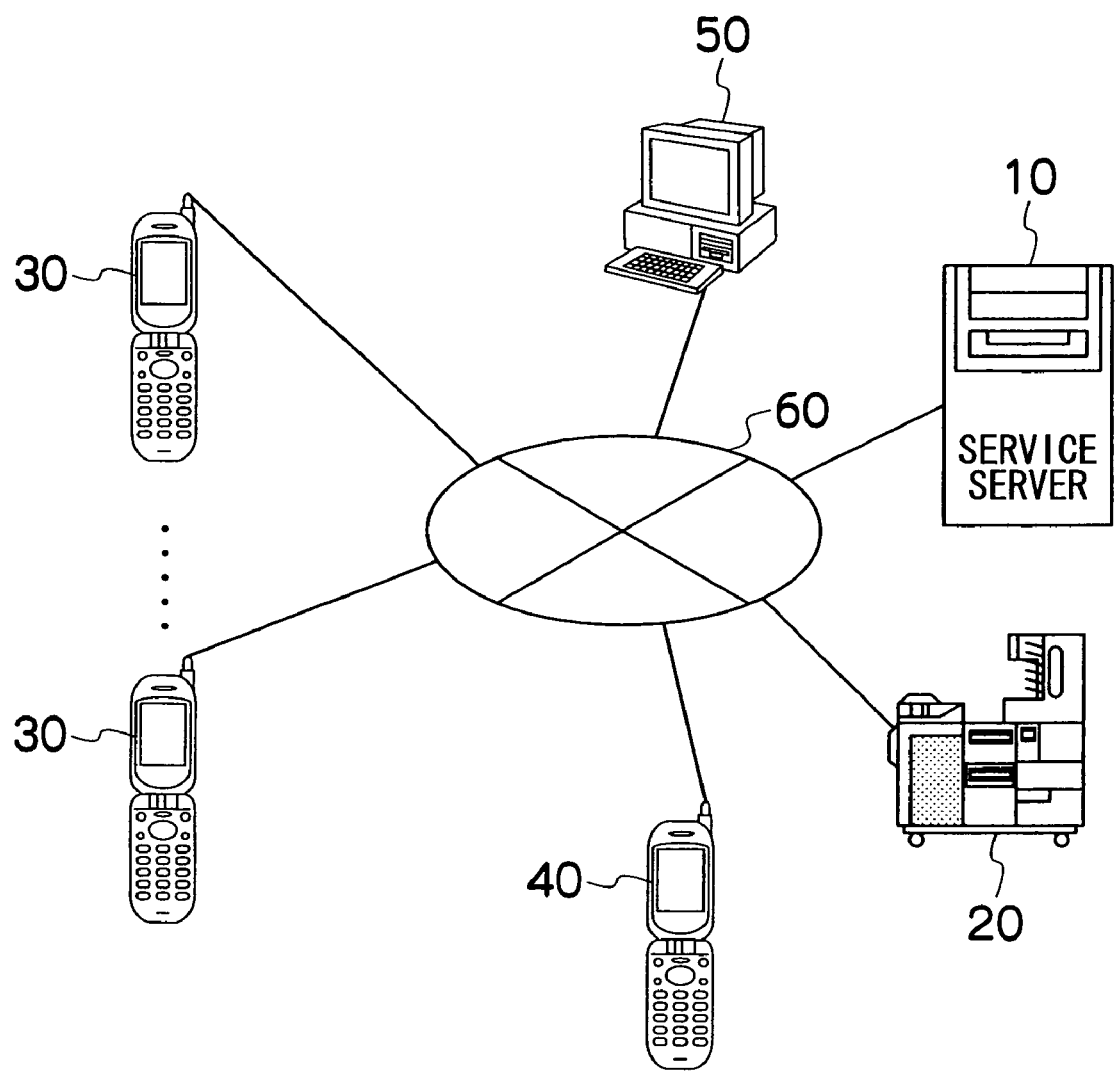
FIG. 1 is a diagram of a whole service system containing a server according to an embodiment of the present invention.

FIG. 1 is a diagram of a whole service system containing a service server 10 according to an embodiment of the present invention. As shown in FIG. 1, the service system comprises: the service server 10; a printer 20; a plurality of camera-equipped mobile telephones (hereinafter referred to simply as "mobile telephones") 30 and 40; and an order receiving terminal 50, and is formed by connecting to each other via a network 60.

The service server 10 communicates with the printer 20, the mobile telephones 30 and 40, and the order receiving terminal 50 via the network 60. The service server 10 performs a photographic print creation processing for creating a photographic print according to a print order by a user, a transmission processing for transmitting at least one of an image and information added to the image printed on the photographic print via the network 60, and various other types of service processing.

The printer 20 forms a photographic print on which an image is printed according to the control of the service server 10. A two-dimensional code such as a QR code (registered trademark) and the like (also referred to as "two-dimensional barcode") is printed together with the image for which printing is ordered. The printer 20 is connected to the service server 10 via the network 60 in FIG. 1, but is not particularly limited to such an example, and may be directly connected to the service server 10, for example, or may be formed in integrated fashion with the service server 10.

The mobile telephones 30 and 40 are capable of photographing a subject. In addition, the mobile telephones 30 and 40 are designed so as to be capable of photographing and decoding a two-dimensional code, and accessing the service server 10 via the network 60 according to the decoding results. Though only two mobile telephones 30 and one mobile telephone 40 are shown in FIG. 1, there are several mobile telephones connected to the network 60 actually.

For convenience in description hereinafter, the first mobile telephone 30 is a mobile telephone in the possession of the user ordering the print (also referred to as "orderer"), which being used for uploading an image to the service server 10 when a print order is made, and the second mobile telephone 40 is a mobile telephone in the possession of the user to whom the photographic print is distributed, which being used for receiving a download which is at least one of an image and additional information of the image from the service server 10. The above arrangement is adopted for convenience in the description hereinafter, but it is actually possible for the second mobile telephone 40 to receive a download which is at least one of an image and additional information of the image from the service server 10 when the user ordering a print is in possession of the photographic print.

According to the embodiment shown in FIG. 1, there are two modes for receiving the print order. As a first mode, a print order is issued from the mobile telephone 40 of the user ordering the print to the service server 10 via the network 60, and then the service server 10 receives the print order. In the first mode, the user's image is uploaded to the service server 10 from the mobile telephone 40 of the user ordering the print. As a second mode, the print order is received by the order receiving terminal 50. In the second mode, the user's image is uploaded to the service server 10 from the order receiving terminal 50.

Figure 2:
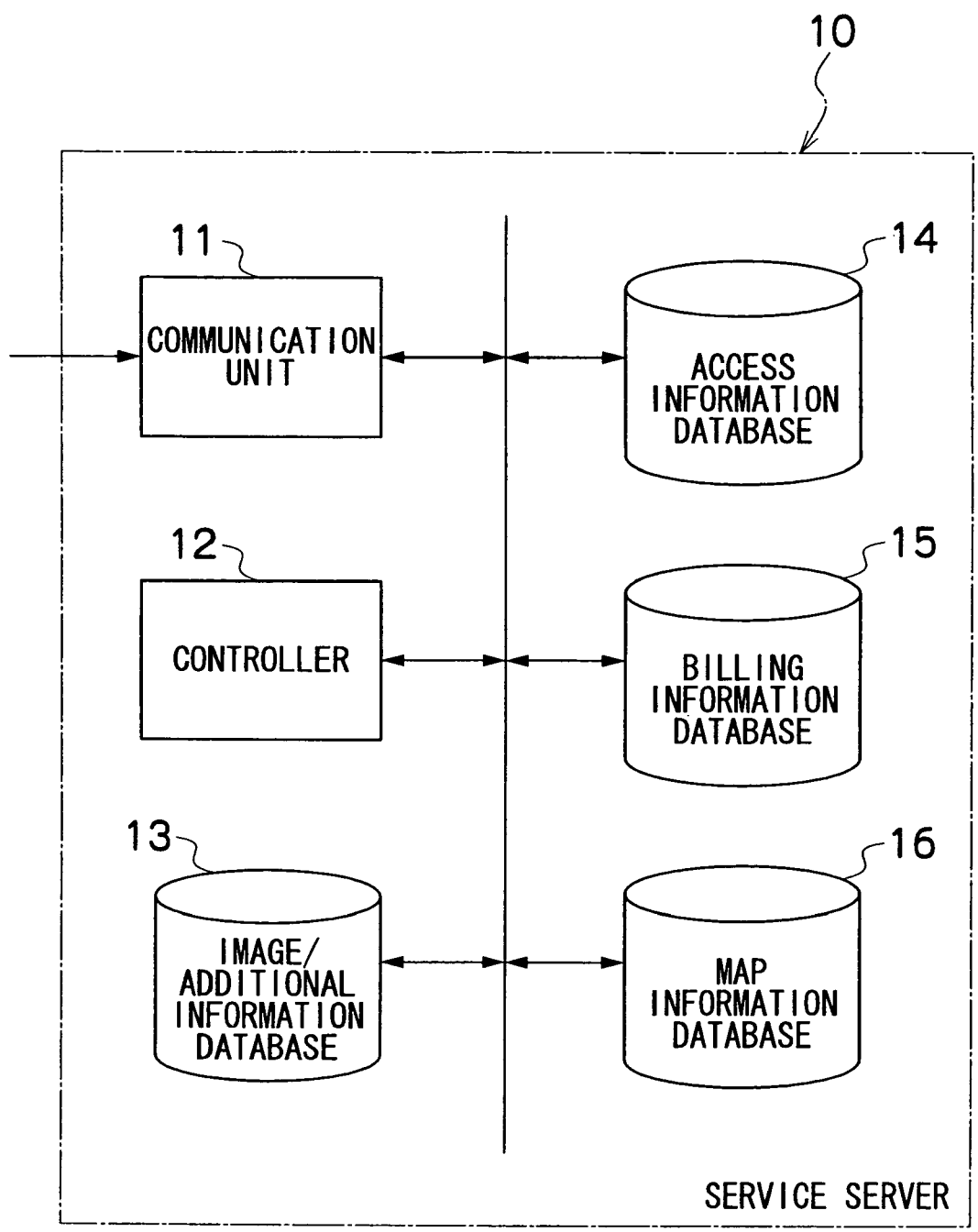
FIG. 2 is a block diagram showing a specific internal structure of the server according to the embodiment.

FIG. 2 is a block diagram showing a specific internal structure of the service server 10 according to the embodiment. In FIG. 2, the service server 10 comprises: a communication unit 11 for communicating with the printer 20; the mobile telephones 30 and 40, and the order receiving terminal 50 via the network 60; a controller 12 composed of a CPU (Central Processing Unit); an image/additional information database 13; an access information database 14; a billing information database 15; and a map information database 16. Incidentally, the databases 13 through 16 are not necessary for being built in a case of the service server 10. A composition in which the databases 13 through 16 are placed remotely from the service server 10, and are connected to the service server 10 via the network 60 shown in FIG. 1 may be adopted.

The communication unit 11 receives order information which the order information being transmitted from the mobile telephone 40 of the user ordering the print shown in FIG. 1 or from the order receiving terminal 50, which the received order information includes the image to be printed. In addition, the communication unit 11 receives access information from the mobile telephone 30 of the user to whom the photographic print will be distributed, and transmits at least one of the image and the additional information thereof to the mobile telephone 30 of access source. The communication unit 11 is capable of communicating with the mobile telephones 30 and 40 and the order receiving terminal 50 by HTTP (Hypertext Transfer Protocol).

The image/additional information database 13 manages the image and additional information thereof for each print order.

Herein, the additional information is information relating to the image to be printed on the photographic print, which includes sound information, text information, filming location information, filming time information, moving image information, still image information, and the like, for example. According to the embodiment, there are a case that the additional information is registered by inputting together with the image from the mobile telephone 40 of the user ordering the print or the order receiving terminal 50 to the service server 10 when the print is ordered, and a case that the additional information is registered by inputting from the mobile telephones 30 and 40 and the like to the service server 10 after the print is ordered.

In addition, the additional information comprises contents forming delivery information which is being delivered from the service server 10 to a user terminal device other than the mobile telephones 30 and 40, via the network 60. Furthermore, there is also a case that the image to be printed is delivered to the user terminal device as delivery information.

The access information database 14 manages information relating to accessing of the service server 10 from the mobile telephone 30. For example, a telephone number of the mobile telephone for which access is permitted for each the images (hereinafter referred to as "access-permitted mobile telephone number") is correlated with image identification information corresponding to each the images and stored in the access information database 14. According to the embodiment, there are a case that the access-permitted mobile telephone number is registered by inputting to the service server 10 together with the image from the mobile telephone 40 of the user ordering the print or the order receiving terminal 50 when the print is ordered, and a case that the access-permitted mobile telephone number is registered by inputting to the service server 10 from the mobile telephone 40 of the user ordering the print after the print is ordered. Additionally, there are a case in which the image identification information corresponds in one-to-one fashion with the image to be printed, and a case in which one set of image identification information corresponds to a plurality of images to be printed that are grouped together in the same print order.

In addition, the access information database 14 is configured so as to a manage storage expiration date of the image and additional information for each the print orders. For example, in the case that the storage expiration data for the additional information is set by default to be one year from the print order date while the storage expiration date for an image is set by default to be one month from the print order date, when the user desires storage for a longer period than those defaults, an extension charge for the extra time may be billed to the user who desires this storage. When the storage expiration date passes, the corresponding image and additional information are deleted from the image/additional information database 13. Moreover, there is also a case in which when the storage period for the image expires sooner than that of the additional information, the additional information remains by itself until its storage period expires while the image is deleted from the image/additional information database 13, which the additional information is also deleted later.

The billing information database 15 manages information relating to each charge for the user ordering the print. In addition, the map information database 16 manages map information for displaying a map in the mobile telephones 30 and 40.

Figure 3:
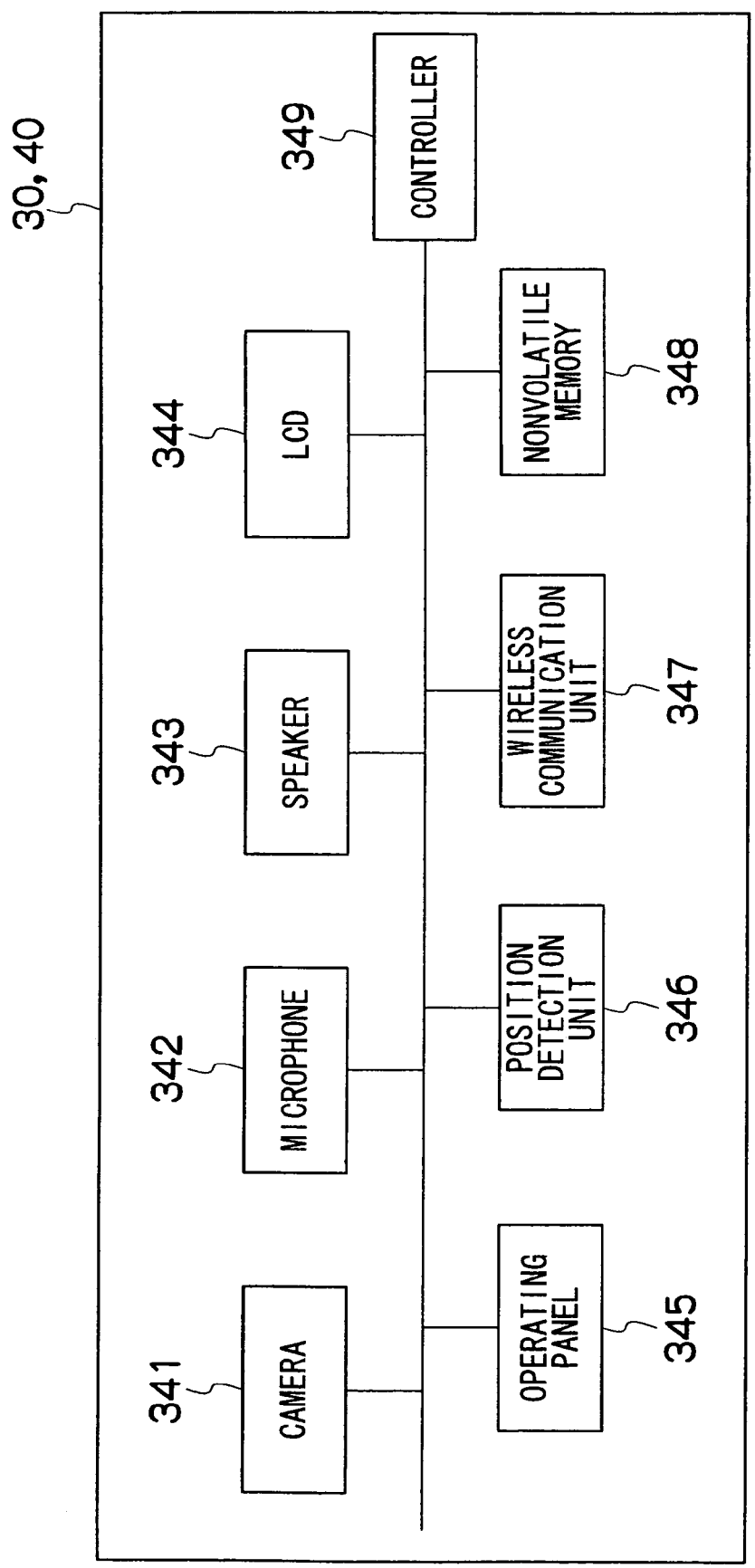
FIG. 3 is a block diagram showing a specific internal structure of a mobile telephone according to the embodiment.

FIG. 3 is a block diagram showing a specific internal structure of the mobile telephone 30 or 40 according to the embodiment. As shown in FIG. 3, each of the mobile telephones 30 and 40 comprises: a camera 341; a microphone 342; a speaker 343; a liquid crystal display (LCD) 344; an operating panel 345; a position detection unit 346; a wireless communication unit 347; nonvolatile memory 348; and a controller 349.

The camera 341 is used for reading a two-dimensional code, besides being used to photograph a subject. The microphone 342 is used for inputting of sound information which is a kind of additional information, as well as used for voice communication. The speaker 343 is used for voice communication and for outputting sound information which is a kind of additional information. The liquid crystal display 344 is used for displaying an image taken with the camera, for displaying electronic mail, and for displaying various types of operating screens, and is also used for outputting text information, moving image information, and other additional information. The operating panel 345 is also used for inputting text information which is a kind of additional information, besides being used for inputting telephone numbers and inputting the contents of electronic mail. The position detection unit 346 detects the current position of the mobile telephones 30 and 40 using a GPS (Global Positioning System). The wireless communication unit 347 communicates with another mobile telephone via a base transceiver station not shown in FIG. 3, and communicates with the service server 10 and other communication devices on the network 60.

The nonvolatile memory 348 stores as following: a control program for controlling the components of the mobile telephones 30 and 40; additional information inputted by the mobile telephones 30 and 40; additional information acquired via the network 60; its own mobile telephone number; address books; and various other types of information. In addition, the nonvolatile memory 348A also stores application programs, Web browser programs, electronic mail programs, game programs, and other various types of application programs that are necessary for ordering a photographic print or accessing the service server 10. Some of these application programs are downloaded via the network 60. Cellular telephone numbers, addresses, names, e-mail addresses, and other personal information of friends or acquaintances are registered in the address book.

The controller 349 executes programs and controls each the components of the mobile telephones 30 and 40.

Figure 4:
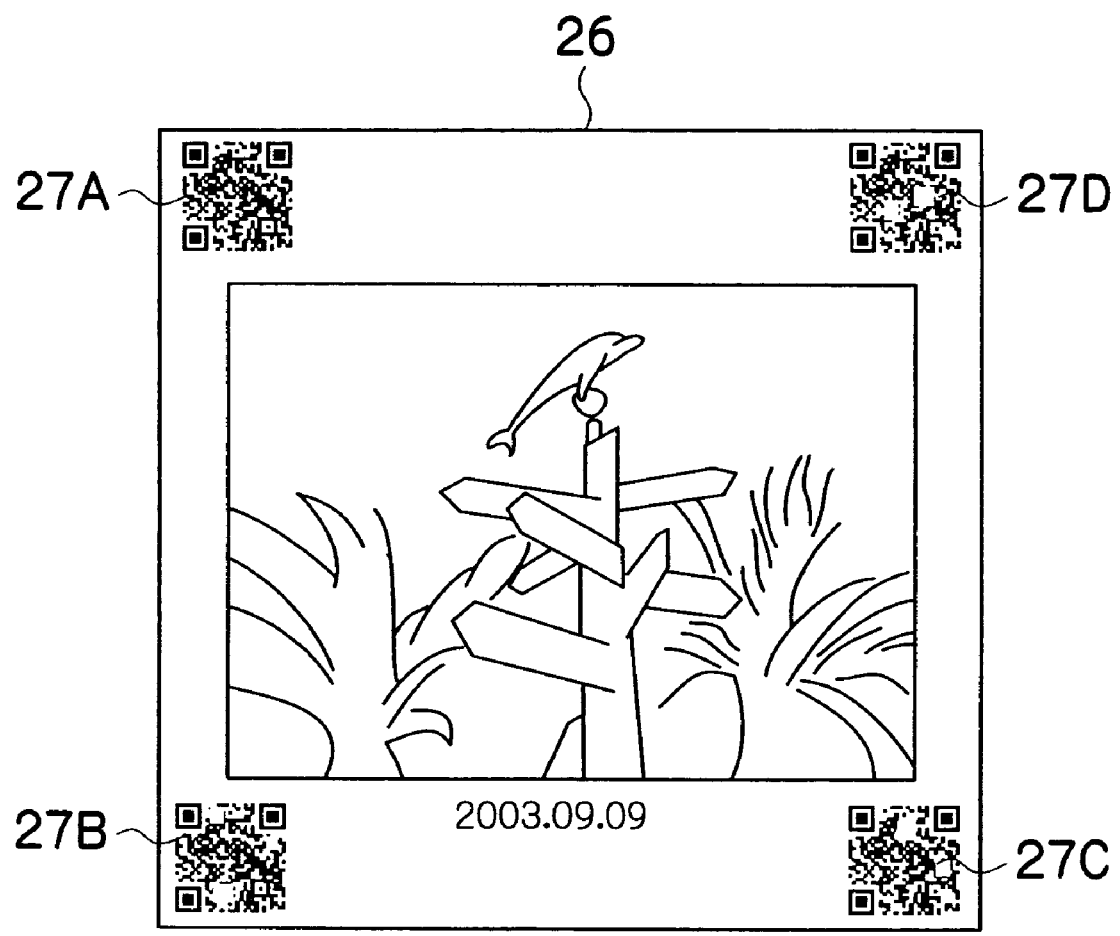
FIG. 4 is a plan view showing an example of a photographic print according to the embodiment.

FIG. 4 is a diagram showing an example of the photographic print 26. In FIG. 4, four two-dimensional codes 27A, 27B, 27C, and 27D are printed in the four corners of the photographic print 26. Each four two-dimensional codes 27A, 27B, 27C, and 27D have different information encrypted therein. For example, when a first two-dimensional code 27A is read, the mobile telephone 30 outputs the sound information, text information, and other additional information which are uploaded to the service server 10 by the user ordering the print. When a second two-dimensional code 27B is read, the mobile telephone 30 displays the mobile telephone number, e-mail address, and memo information ("Your print order is ready. Please contact." or the like) of the user ordering the photographic print 26, for example. When a third two-dimensional code 27C is read, the mobile telephone 30 displays a message "Sorry! Try Again.", for example, and then the service server 10 is notified that the two-dimensional code containing the message "Sorry! Try Again" has been read. When a fourth two-dimensional code 27D is read, a message "Congratulations! You Win!" is displayed in the mobile telephone 30, for example, and the service server 10 is notified the two-dimensional code containing the message "Congratulations! . . ." has been read. When the two-dimensional code containing a message "You Win!" is read without reading the two-dimensional code containing the message "Sorry! Try Again."; more specifically, when there is a notification that the two-dimensional code containing the message "You Win!" was read without notification that the two-dimensional code containing the message "Sorry! Try Again" was read, a free gift is sent to the user to whom the photographic print 26 is distributed. Therefore, it is possible to make the experience of using the mobile telephone 30 to read the two-dimensional code to resemble that of a card scratch-and-win game. In addition, it is possible for the user to experience the fin of finding out what type of information will be outputted only after the two-dimensional code is read.

Hereinafter, the service system and service method in each of first through third embodiments will be described in detail.

Figure 5A:
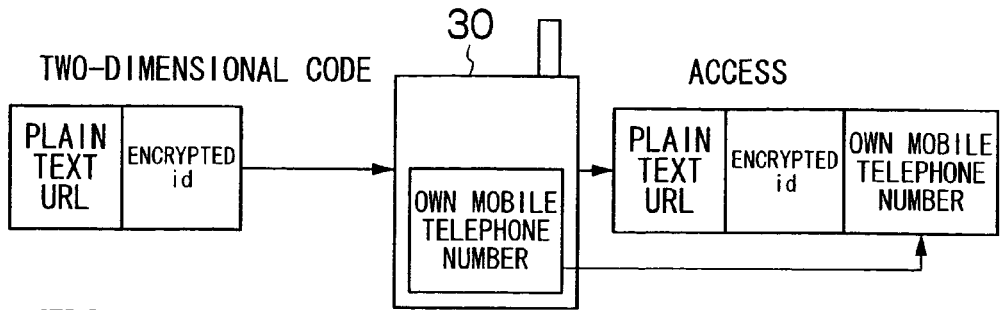
FIGS. 5A to 5E are diagrams showing each of examples for explaining information which is recorded as a two-dimensional code in the photographic print and information which is transmitted to the server when the server is accessed.

In the first embodiment, encrypted image identification information id is added to a plain text URL (containing a communication protocol name and a domain name of the service server 10) necessary for connecting to the service server 10, and is recorded as a two-dimensional code 27 on the photographic print 26, as shown in FIG. 5A. When the mobile telephone 30 of the user to whom the photographic print 26 is distributed reads the two-dimensional code 27 and accesses the service server 10, the plain text URL, the encrypted image identification information id, and the user's own mobile telephone number which is stored in advance in the mobile telephone 30 are transmitted to the service server 10.

Figure 6:
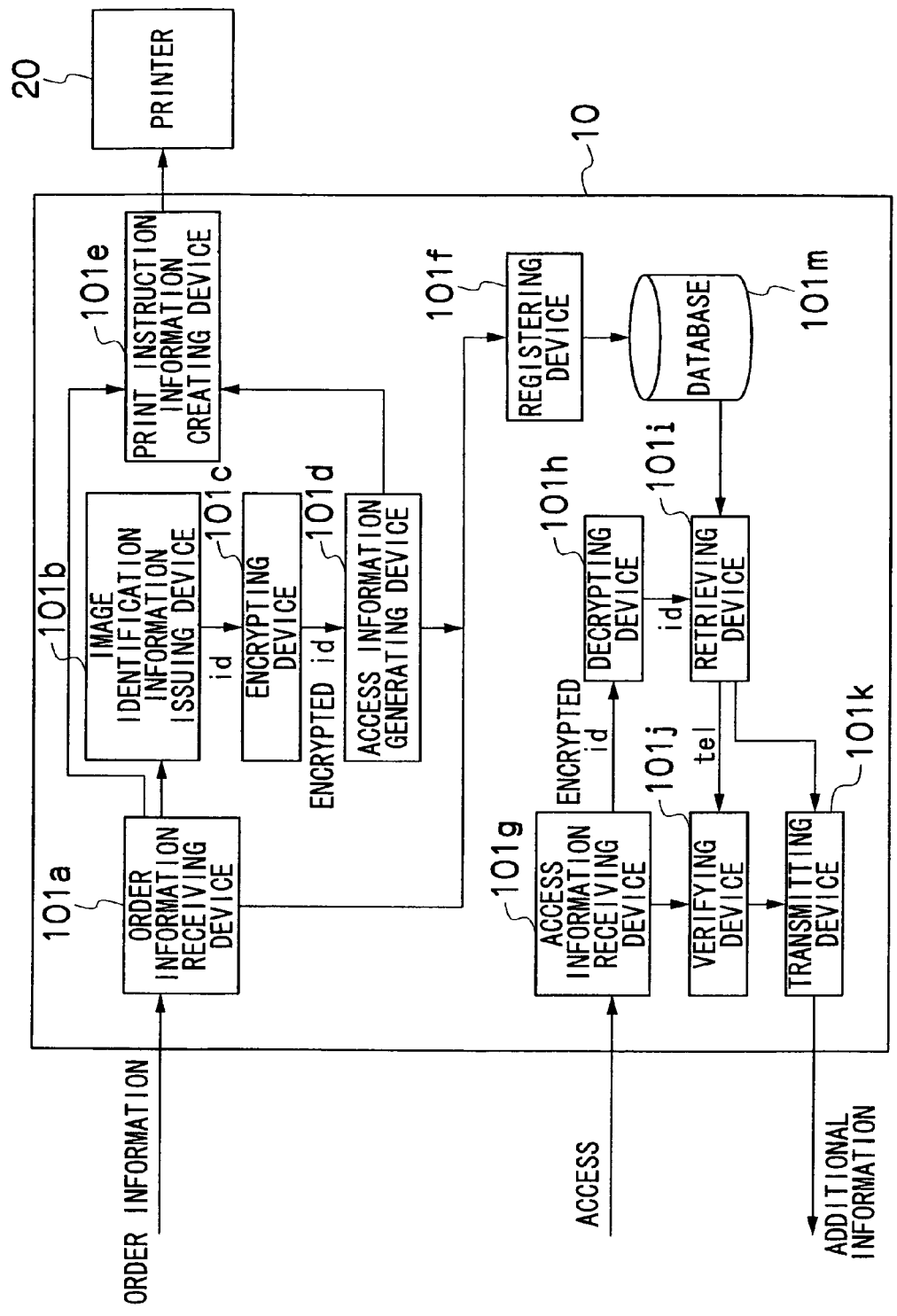
FIG. 6 is a schematic block diagram showing a configuration of a server according to a first embodiment of the present invention.

FIG. 6 is a schematic block diagram showing a conceptual structure of the service server 10 according to the first embodiment. As shown in FIG. 6, the service server 10 comprises: an order information receiving device 101a; an image identification information issuing device 101b; an encrypting device 101c; an access information generating device 101d; a print instruction information creating device 101e; a registering device 101f; an access information receiving device 101g; a decrypting device 101h; a retrieving device 101i; a verifying device 101j; a transmitting device 101k; and a database 101m.

The order information receiving device 101a receives order information (containing the image to be printed, the information added to the image, and the mobile telephone number having permission to access the image).

The image identification information issuing device 101b issues image identification information id.

Herein, the image identification information id identifies the additional information of the image, while identifying the image to be printed. More specifically, the image identification information id identifies contents forming delivery information which is delivered from the service server 10 to a user terminal device other than the mobile telephones 30 and 40, via the network 60. In addition, there is also a case that the image identification information id is referred to as contents identification information. Furthermore, if the contents forming the delivery information are sound information, the image identification information id may be referred as sound identification information.

The encrypting device 101c encrypts the image identification information id using an encryption key of the service server 10.

The access information generating device 101d generates access information by adding the encrypted image identification information id to the plain text URL.

Herein, the URL (Uniform Resource Locator) includes the communications protocol and the domain name necessary in order for the user terminal device to receive a delivery service for delivering contents within the various services of the service server 10, while being connected in a communicable fashion with the service server 10. Various types of variables are appended to this URL.

In the following description, the "URL" is described as an element constituted by a communications protocol and a domain name. In addition, "access information" is described as an element obtained by adding variables, such as the image identification information id, to the "URL".

The print instruction information creating device 101e creates instruction information in which the printer 20 records the image to be printed together with the access information on a prescribed print medium. The printer 20 forms the photographic print 26 according to this instruction information. The registering device 101f registers the image to be printed, the additional information, and the mobile telephone number having access permission associated with the image identification information id in the database 101m.

When the two-dimensional code 27 on the photographic print 26 is read by the mobile telephone 30 of the user to whom the photographic print 26 is distributed, the access information receiving device 101g receives a plain text URL, the encrypted image identification information id, and the user's own mobile telephone number registered in advance in the access origin mobile telephone 30 from the access origin mobile telephone 30. The decrypting device 101h decrypts the encrypted image identification information id using a decryption key of the service server 10. The retrieving device 101i retrieves the mobile telephone number having access permission that is correlated with the decrypted image identification information id, from the database 101m. The verifying device 101j verifies the retrieved mobile telephone number which has access permission, against the mobile telephone number received from the mobile telephone 30. The transmitting device 101k transmits the additional information of the image corresponding to the decrypted image identification information id to the mobile telephone 30 when both the mobile telephone numbers match, while prohibiting access from the mobile telephone 30 when the mobile telephone numbers do not match.

According to the first embodiment, briefly described the relationship between the constituent elements of the service server 10 shown in FIG. 6 and the constituent elements of the service server 10 shown in FIG. 2, the communication unit 11 shown in FIG. 2 comprises the order information receiving device 101a, the access information receiving device 101g, and the transmitting device 101k shown in FIG. 6. In addition, the controller 12 shown in FIG. 2 comprises the image identification information issuing device 101b, the encrypting device 101c, the access information generating device 101d, the print instruction information creating device 101e, the registering device 101*f*, the decrypting device 101*h*, the retrieving device 101*i*, and the verifying device 101*j* shown in FIG. 6.

According to the above first embodiment, the service processing of the service server 10 will be described in detail using FIG. 7.

First, the user ordering the print takes a picture using the mobile telephone 40 (S101).

At this time, the sound information can be added to the image obtained for printing, and is inputted using the microphone 342 of the mobile telephone 40. In addition, text information may also be added to the image to be printed, and is inputted using the operating panel 345 of the mobile telephone 40. Furthermore, the shooting time information and the shooting location detected by the position detection unit 346 of the mobile telephone 40 at the time of shooting are also added to the image. While this type of additional information can be inputted before the photographic print 26 is ordered from the service server 10, the additional information may be inputted after creation of the photographic print 26 is ordered as described hereinafter.

Then, the user ordering the print operates the mobile telephone 40 and orders the photographic print 26 (S102).

More specifically, the user specifies which image will be printed, first. Then, the user inputs the telephone number for which access of the additional information of the image is permitted. Herein, the access-permitted mobile telephone number tel is usually the mobile telephone number of the user to whom the photographic print 26 will be distributed. In addition, when both creation of a photographic print 26 and delivery of the photographic print 26 are requested, the address and name of the user to whom the photographic print 26 will be distributed is also inputted.

Incidentally, there is no need for all of the letters and numbers constituting the access-permitted mobile telephone number tel, the address, and the name to be inputted by hand. The inputting may also be performed by selecting a destination already registered in the address book managed by the mobile telephone 40. In addition, a configuration may also be adopted in which the information is inputted by reading from a business card.

Additionally, when an image is printed on a size of paper other than the default standard size, the user also specifies the paper size. The number of copies of the photographic print 26 is specified for destination of users who desire a plurality of copies of the photographic print 26.

Next, the user ordering the print performs the prescribed transmission operation using the mobile telephone 40, whereupon the order information is transmitted from the mobile telephone 40 to the service server 10 via the network 60 (S103). Herein, the order information comprises the image, the additional information (such as sound information, text information, shooting location information, and the like), and the access-permitted mobile telephone number tel. In a case in which the user ordering the print requests both creation of a photographic print 26 and delivery of the photographic print 26, the order information also includes the address and name of the person to whom the photographic print 26 will be delivered.

In addition, the print order can be received by the order receiving terminal 50. In this case, the order information is transmitted from the order receiving terminal 50 to the service server 10.

Next, in the service server 10 that has received the order information, the image identification information id corresponding to each the images to be printed is issued (S11), the image identification information id is encrypted (S112), and then access information containing a plain text URL and the encrypted image identification information id is generated (S113).

In the first embodiment, the access information is "http://oto.jp?id=xyz," for example. In this example, "http://oto.jp" is the plain text URL, and is composed of the communication protocol name ("http") and the domain name ("oto.jp") of the service server 10. In addition, "xyz" is the encrypted image identification information id, and is incorporated into the access information as the value of a variable delivered to the service server 10 to which the connection is made.

Next, the service server 10 correlates the order information (image, additional information, access-permitted mobile telephone number tel, and the like) received from the mobile telephone 40 and the access information with the image identification information id issued by the service server 10, and registers the correlated information in the database 101*m* (S114). In the first embodiment, it is particularly important that the access-permitted mobile telephone number tel is correlated with the image identification information id and registered in the database 101*m*.

Then, at least one of the image and the access information is transmitted from the service server 10 to the printer 20 (S115). Herein, it is preferable to encrypt the access information into a two-dimensional code at the service server 10 and transmitted to the printer 20, or to encrypt into a two-dimensional code at the printer 20.

The printer 20 forms the photographic print 26 according to the image and access information received from the service server 10 (S116). Herein, the access information is in the form of a two-dimensional code 27, and is printed together with the printed image 28 on the same paper.

Incidentally, the formed photographic print 26 is either delivered to a prescribed destination as designated by the user who ordered the print, or is delivered to the user who ordered the print.

Moreover, it is also possible for an additional order to be made for forming a photographic print 26, in which case a change or addition of another access-permitted mobile telephone number tel can be requested of the service server 10 from the mobile telephone 40 of the user ordering the print.

Next, according to the first embodiment, the sequence of processing when the additional information of the image is transmitted to the mobile telephone 30 to which the photographic print 26 is delivered will be described.

First, the user to whom the photographic print 26 is distributed sets the user's mobile telephone 30 to a two-dimensional code reading mode, and uses the mobile telephone 30 to read the two-dimensional code 27 on the photographic print 26 (S121). The read two-dimensional code 27 is decoded by the mobile telephone 30, and access information is obtained from the decoded result.

In the first embodiment, the access information includes the plain text URL necessary for connecting to the service server 10 via the network 60, and encrypted image identification information id. The access information in this arrangement is "http://oto.jp?id=xyz," for example.

The mobile telephone 30 reads its own mobile telephone number from the nonvolatile memory 348 of the mobile telephone 30 (S122).

Next, the mobile telephone 30 accesses the service server 10 using the access information (S123). At this time, the mobile telephone 30 transmits the plain text URL, the encrypted image identification information id, and its own mobile telephone number to the service server 10.

Incidentally, in the first embodiment, there are a mode in which the mobile telephone number of the mobile telephone 30 is added to the encrypted image identification information id that is a first variable and is transmitted to the service server 10 as a second variable, and a mode in which the mobile telephone number of the mobile telephone 30 is transmitted to the service server 10 separately from the encrypted image identification information id.

Next, the server 10 accessed from the mobile telephone 30 decrypts the encrypted image identification information id (S124), retrieves the access-permitted mobile telephone number tel associated with the decrypted image identification information id from the database 101m (S125), and then verifies the access-permitted mobile telephone number tel thus retrieved against the mobile telephone number transmitted by the access origin mobile telephone 30 (S126).

When both mobile telephone numbers match in the above verification, the service server 10 retrieves the additional information of the image (such as sound information, text information, shooting location information, and the like) corresponding to the image identification information id from the database 101m, and then transmits it to the mobile telephone 30 of access source via the network 60 (S127).

Then, the additional information transmitted to the mobile telephone 30 of access source is outputted by the mobile telephone 30 (S128). For example, the sound information associated with the image on the photographic print 26 is played back by the speaker 343 of the mobile telephone 30. In addition, the text information associated with the image on the photographic print 26 is displayed on the LCD 344 of the mobile telephone 30, for example. Furthermore, when the user changes the screen of the mobile telephone 30 using the operating panel 345, a map showing the shooting location is displayed on the LCD 344 of the mobile telephone 30.

Figure 5B:
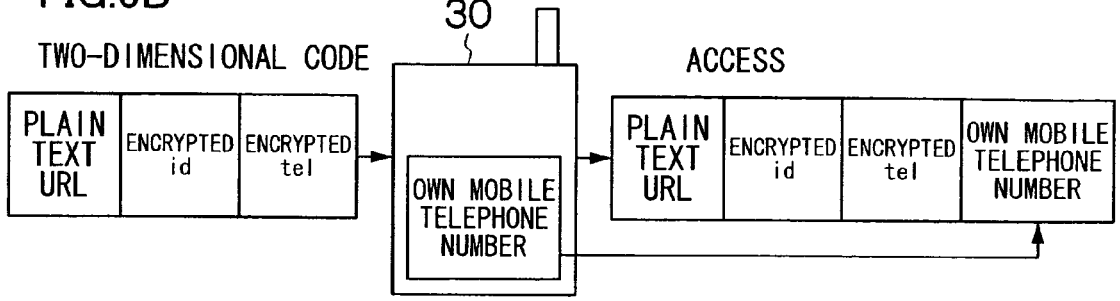
Figure 5C:
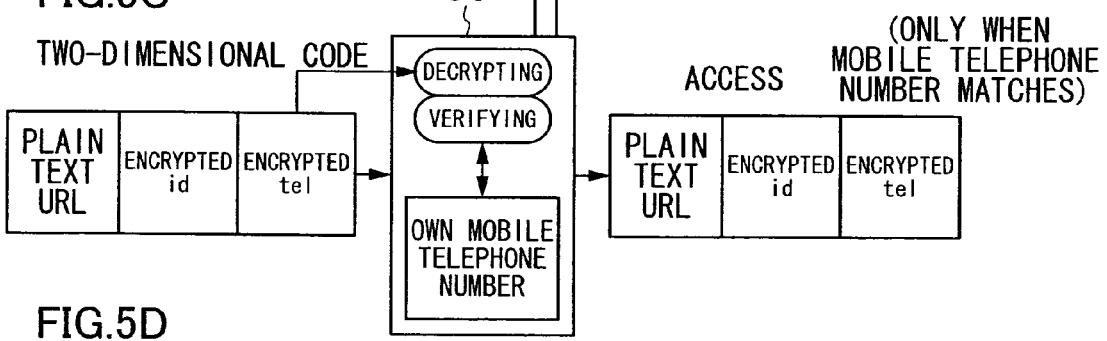
Figure 5D:
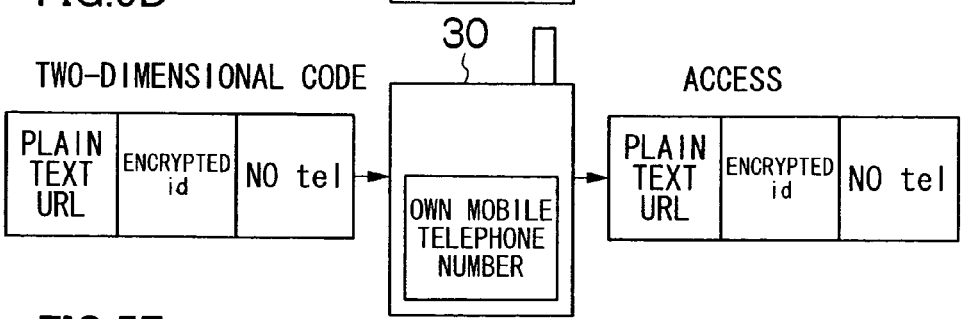

As described above, the embodiment is explained in a case that the access-permitted mobile telephone number tel is inputted with the mobile telephone 40 of the user ordering the print when ordering the print, but an access-permitted mobile telephone number tel is not inputted when the user ordering the print distributes a photographic print to an unspecified number of people and elects to permit access by an unspecified number of people. More specifically, information which indicates no access-permitted mobile telephone number tel is specified ("No tel") is incorporated together with the plain text URL and the encrypted image identification information id into the two-dimensional code 27 as shown in FIG. 5D, and recorded in the photographic print 26. At this time, the server 10 does not receive notification from the mobile telephone 30 of the user to whom the photographic print 26 is distributed of its own mobile telephone number, and the plain text URL and encrypted image identification information id are transmitted to the service server 10 (S123). Then, in the service server 10, after the image identification information id is decrypted (S124), the additional information corresponding to the image identification information id is downloaded (S127) without retrieving of the access-permitted mobile telephone number tel (S125) or verification of the mobile telephone number (S126). However, when an access-permitted mobile telephone number tel has been registered that corresponds to the image identification information id relevant to the database 101m, access by the mobile telephone 30 is denied even if the notification "No tel" is received from the mobile telephone 30.

Next, a second embodiment will be described. As shown in FIG. 5B, in the second embodiment, encrypted image identification information id and an encrypted access-permitted mobile telephone number tel are added to the plain text URL necessary for connecting to the service server 10, and is recorded on the photographic print 26 as a two-dimensional code 27. In the case that the mobile telephone 30 of the user to whom the photographic print 26 is distributed reads the two-dimensional code and accesses the service server 10, the plain text URL, the encrypted image identification information id, the encrypted access-permitted mobile telephone number tel, and the own mobile telephone number stored in advance in the mobile telephone 30 are transmitted to the service server 10.

FIG. 8 is a schematic block diagram showing the configuration of the service server 10 according to the second embodiment. As shown in FIG. 8, the service server 10 comprises: an order information receiving device 102a; an image identification information issuing device 102b; an encrypting device 102c; an access information generating device 102d; a print instruction information creating device 102e; a registering device 102f; an access information receiving device 102g; a decrypting device 102h; a retrieving device 102i; a verifying device 102j; a transmitting device 102k; and a database 102m.

The order information receiving device 102a receives order information (containing the image to be printed, the information added to the image, and the mobile telephone number tel having permission to access the image). The image identification information issuing device 102b issues image identification information id. The encrypting device 102c encrypts the image identification information id and the access-permitted mobile telephone number tel using the encryption key of the service server 10. The access information generating device 102d adds the encrypted image identification information id and the encrypted access-permitted mobile telephone number tel to the plain text URL, and generates access information. The print instruction information creating device 102e creates instruction information in which the printer 20 records the image to be printed together with the access information on a prescribed print medium. The printer 20 forms the photographic print 26 according to the above instruction information. The registering device 102f registers correlates at least one of the image and the additional information to be printed, associated with the image identification information id in the database 102m.

The access information receiving device 102g receives the plain text URL, the encrypted image identification information id, the encrypted access-permitted mobile telephone number tel, and the own mobile telephone number registered in advance in the access origin mobile telephone 30 from the access origin mobile telephone 30, when the two-dimensional code 27 on the photographic print 26 is read by the mobile telephone 30 of the user to whom the photographic print 26 is distributed. The decrypting device 102h decrypts the encrypted image identification information id and the encrypted access-permitted mobile telephone number tel using the decryption key of the service server 10. The retrieving device 102i retrieves the additional information correlated with the decrypted image identification information id from the database 102m. The verifying device 102j verifies the decrypted mobile telephone number having access permission against the mobile telephone number received from the access origin mobile telephone 30. The transmitting device 102k transmits the additional information of the image corresponding to the decrypted image identification information id to the access origin mobile telephone 30 when both the mobile telephone numbers match, while prohibiting access from the mobile telephone 30 when the mobile telephone numbers do not match.

According to the second embodiment, briefly describing the relationship between the constituent elements of the service server 10 shown in FIG. 8 and the constituent elements of the service server 10 shown in FIG. 2, the communication unit 11 shown in FIG. 2 comprises the order information receiving device 102*a*, access information receiving device 102*g*, and transmitting device 102*k* shown in FIG. 8. In addition, the controller 12 shown in FIG. 2 comprises the image identification information issuing device 102*b*, encrypting device 102*c*, access information generating device 102*d*, print instruction information creating device 102*e*, registering device 102*f*, decrypting device 102*h*, retrieving device 102*i*, and verifying device 102*j* shown in FIG. 8.

According to the second embodiment described above, the service sequence of the service server 10 will be described in detail using FIG. 9.

First, the user ordering the print takes a photograph of a subject using the mobile telephone 40 (S201), performs the ordering operation for the photographic print 26 (S202), and performs the prescribed transmission operation. Then, the order information is then transmitted from the mobile telephone 40 to the service server 10 via the network 60 (S203). The order information herein contains the image, the additional information (such as sound information, text information, shooting location information, and the like), and the access-permitted mobile telephone number tel. In the case in which the user ordering the print requests both the creation of a photographic print 26 and the delivery of the photographic print 26, the order information also includes the address and name of the person to whom the photographic print 26 will be delivered.

Incidentally, it is also possible to receive the print order by the order receiving terminal 50. In this case, the order information is transmitted from the order receiving terminal 50 to the service server 10.

In the service server 10 that has received the order information, the image identification information id corresponding to each the images to be printed is issued (S211), the image identification information id and the access-permitted mobile telephone number tel are encrypted (S212), and access information containing a plain text URL, the encrypted image identification information id, and the encrypted access-permitted mobile telephone number tel is generated (S213).

In the second embodiment, for example, the access information is "http://oto.jp?id=xyz&tel=ABCDEFGHIJK." In this example, "http://oto.jp" is the plain text URL, and is composed of the communication protocol name ("http") and the domain name ("oto.jp") of the service server 10. In addition, "xyz" is the encrypted image identification information id, and is incorporated into the access information as the value of a first variable delivered to the service server 10 to which the connection is made. "ABCDEFGHIJK" is the encrypted access-permitted mobile telephone number tel, and is incorporated into the access information as the value of a second variable delivered to the service server 10 to which the connection is made.

Next, the service server 10 correlates at least one of the image and additional information among the order information received from the mobile telephone 40 with the image identification information id issued by the service server 10, and registers the same in the database 102*m* (S214). In the second embodiment, there is no need for the access-permitted mobile telephone number tel to be managed by the database 102*m*.

Then, at least one of the image and the access information is transmitted from the service server 10 to the printer 20 (S215), and the photographic print 26 is created by the printer 20 (S216). Herein, it is preferable to print the access information as a two-dimensional code 27 together with the printed image 28 on the same paper.

Next, according to the second embodiment, the sequence of processing when the additional information of the image is transmitted to the mobile telephone 30 to which the photographic print 26 is delivered will be described.

First, the user to whom the photographic print 26 is distributed sets the user's mobile telephone 30 to a two-dimensional code reading mode, and uses the mobile telephone 30 to read the two-dimensional code 27 on the photographic print 26 (S221).

In the second embodiment, the access information includes the plain text URL, the encrypted image identification information id, and the encrypted access-permitted mobile telephone number tel. For example, the access information is "http://oto.jp?id=xyz&tel=ABCDEFGHIJK."

Next, the mobile telephone 30 reads its own mobile telephone number from the nonvolatile memory 348 of the mobile telephone 30 (S222).

Then, the mobile telephone 30 accesses the service server 10 using the access information (S223). At this time, the mobile telephone 30 transmits the plain text URL, the encrypted image identification information id, the encrypted access-permitted mobile telephone number tel, and its own mobile telephone number to the service server 10.

Incidentally, in this embodiment, there are a mode in which the mobile telephone number of the mobile telephone 30 is added to the encrypted image identification information id that is a first variable and the encrypted access-permitted mobile telephone number tel that is the second variable and is transmitted to the service server 10 as a third variable, and a mode in which the mobile telephone number of the mobile telephone 30 is transmitted to the service server 10 separately from the first and second variables.

Next, the server 10 accessed from the mobile telephone 30 decrypts the encrypted image identification information id and encrypted access-permitted mobile telephone number tel (S224).

Then, the decrypted access-permitted mobile telephone number tel is verified against the own mobile telephone number registered in advance in the access origin mobile telephone 30 (S226).

When both mobile telephone numbers match in the verification, the service server 10 retrieves the additional information of the image (such as sound information, text information, shooting location information, and the like) corresponding to the image identification information id from the database 102*m*, and transmits it to the mobile telephone 30 of access source via the network 60 (S227).

In addition, the additional information transmitted to the mobile telephone 30 of access source is outputted by the mobile telephone 30 (S228).

Incidentally, when the mobile telephone 30 sends its own mobile telephone number (terminal identifier), it is possible to send the mobile telephone number which has been encrypted. In this case, the encrypted mobile telephone number is decrypted by the decrypting device 102*h* of the service server 10.

Next, a third embodiment will be described. As shown in FIG. 5C, in the third embodiment, encrypted image identification information id and an encrypted access-permitted mobile telephone number tel are added to the plain text URL necessary for connecting to the service server 10, and this information is recorded on the photographic print 26 as a two-dimensional code 27. When the mobile telephone 30 of the user to whom the photographic print 26 is distributed reads the two-dimensional code and accesses the service server 10, the mobile telephone 30 reads the two-dimensional code on the photographic print 26, and decrypts the encrypted access-permitted mobile telephone number tel. Then, the mobile telephone 30 accesses the service server 10 only when the decrypted access-permitted mobile telephone number tel matches the own mobile telephone number stored in advance in the mobile telephone 30.

FIG. 10 is a schematic block diagram showing the configuration of the service server 10 according to the third embodiment. As shown in FIG. 10, the service server 10 comprises: an order information receiving device 103a; an image identification information issuing device 103b; an encrypting device 103c; an access information generating device 103d; a print instruction information creating device 103e; a registering device 103f; an access information receiving device 103g; a decrypting device 103h; a retrieving device 103i; a transmitting device 103k; and a database 103m.

The order information receiving device 103a receives order information (containing the image to be printed, the information added to the image, and the encrypted mobile telephone number tel having permission to access the image). The image identification information issuing device 103b issues image identification information id. The encrypting device 103c encrypts the image identification information id using the encryption key of the service server 10. The access information generating device 103d adds the encrypted image identification information id and the encrypted access-permitted mobile telephone number tel to the plain text URL and generates access information. The print instruction information creating device 103e creates instruction information in which the printer 20 records the image to be printed together with the access information on a prescribed print medium. The printer 20 forms the photographic print 26 according to the above instruction information. The registering device 103f registers the image to be printed and the additional information associated with the image identification information id in the database 103m.

The access information receiving device 103g receives the access information containing the plain text URL and the encrypted image identification information id from the mobile telephone 30, when the two-dimensional code 27 on the photographic print 26 is read by the mobile telephone 30 of the user to whom the photographic print 26 is distributed. The decrypting device 103h decrypts the encrypted image identification information id using the decryption key of the service server 10. The retrieving device 103i retrieves the additional information correlated with the image identification information id thus decrypted from the database 103m. The transmitting device 103k transmits the additional information of the image corresponding to the decrypted image identification information id to the mobile telephone 30 of access source.

According to the third embodiment, briefly describing the relationship between the constituent elements of the service server 10 shown in FIG. 10 and the constituent elements of the service server 10 shown in FIG. 2, the communication unit 11 shown in FIG. 2 comprises the order information receiving device 103a, access information receiving device 103g, and transmitting device 103k shown in FIG. 10. In addition, the controller 12 shown in FIG. 2 comprises the image identification information issuing device 103b, encrypting device 103c, access information generating device 103d, print instruction information creating device 103e, registering device 103f, decrypting device 103h, and retrieving device 103i shown in FIG. 10.

The mobile telephone 40 of the user ordering the print also has an encrypting device 403c for encrypting the access-permitted mobile telephone number tel. The mobile telephone 30 of the user to whom the photographic print is distributed (as the mobile telephone 30 of access source) comprises: a decrypting device 303h which decrypts the encrypted access-permitted mobile telephone number tel; a verifying device 303j which verifies the decrypted access-permitted mobile telephone number tel against the own mobile telephone number stored in advance in the mobile telephone 30; and an access control device 303 which controls the service server 10 for being accessed when both mobile telephone numbers match in the verification, while controlling the service server 10 for not being accessed when the mobile telephone numbers do not match.

The controller 349 of the mobile telephones 30 and 40 shown in FIG. 3 comprises: the encrypting device 403c; decrypting device 303h; verifying device 303j; and access control device 303 in the mobile telephones 30 and 40 shown in FIG. 10.

According to the third embodiment described above, the service sequence of the service server 10 and the mobile telephones 30 and 40 will be described in detail using FIG. 11.

First, the user ordering the print takes a photograph of a subject using the mobile telephone 40 (S301), and performs the ordering operation for the photographic print 26 (S302).

In the operation for ordering the photographic print 26A, it is possible for the user ordering the print to input an access-permitted mobile telephone number for each images to be printed. When the access-permitted mobile telephone number is inputted, the mobile telephone 40 encrypts the access-permitted mobile telephone number tel (S303).

Incidentally, according to the decryption key for decrypting the access-permitted mobile telephone number tel, there is also a method of passing to the mobile telephone 30 of the destination user by transmitting an e-mail message containing the decryption key from the mobile telephone 40 of the user ordering the print to the mobile telephone 30 of the user to whom the photographic print 26 is distributed. Herein, the e-mail message may be transmitted in either a POP format or a touch-tone format. Therefore, the mobile telephone 30 of the destination user stores the decryption key acquired in the nonvolatile memory 348 of the mobile telephone 30.

At the same time, in the case of using a public encryption key, it is preferable to acquire in advance the public key of the mobile telephone 30 of the user to whom the photographic print 26 is distributed using the mobile telephone 40 of the user ordering the print, and then to encrypt the access-permitted mobile telephone number tel using the public key of the destination user's mobile telephone 30 as the encryption key. In this case, the encrypted access-permitted mobile telephone number is decrypted using a secret key corresponding to the public key in the mobile telephone 30 of the user to whom the photographic print 26 is distributed.

Next, the user ordering the print performs the prescribed transmission operation using the mobile telephone 40, whereupon the order information is transmitted from the mobile telephone 40 to the service server 10 via the network 60 (S304). Herein, the order information includes the image, the additional information (such as sound information, text information, shooting location information, and the like), and the encrypted access-permitted mobile telephone number tel. In a case in which the user ordering the print performs an operation for requesting both formation of a photographic print 26 and delivery of the photographic print 26, the order information also includes the address and name of the person to whom the photographic print 26 will be delivered.

Next, in the service server 10 that has received the order information, the image identification information id corresponding to each the images to be printed is issued (S311), the image identification information id is encrypted using the encryption key of the server 10 (S312), and then access information containing a plain text URL, the encrypted image identification information id, and the encrypted access-permitted mobile telephone number tel is generated (S313).

In the third embodiment, for example, the access information is "http://oto.jp?id=xyz&tel=ABCDEFGHIJK." In this example, "http://oto.jp" is the plain text URL. In addition, "xyz" is the encrypted image identification information id encrypted by the service server 10. Furthermore, "ABCDEFGHIJK" is the encrypted access-permitted mobile telephone number tel encrypted by the mobile telephone 40 of the user ordering the print.

Next, the service server 10 correlates at least one of the image and additional information among the order information received from the mobile telephone 40 with the image identification information id issued by the service server 10, and registers the same in the database 103m (S314). In the third embodiment, there is no need for the access-permitted mobile telephone number tel to be managed by the database 103m, as similar to the second embodiment.

Then, at least one of the image and the access information is transmitted from the service server 10 to the printer 20 (S315), and the photographic print 26 is formed by the printer 20 (S316). Herein, the access information is printed as a two-dimensional code 27 together with the printed image 28 on the same paper.

Next, according to the third embodiment, the sequence of processing when the additional information of the image is transmitted to the mobile telephone 30 to which the photographic print 26 is delivered will be described.

First, the user to whom the photographic print 26 is distributed sets the user's mobile telephone 30 to a two-dimensional code reading mode, and then uses the mobile telephone 30 to read the two-dimensional code 27 on the photographic print 26 (S321).

In the third embodiment, the access information includes the plain text URL, the encrypted image identification information id, and the encrypted access-permitted mobile telephone number tel. For example, the access information in this arrangement is "http://oto.jp?id=xyz&tel=ABCDEFGHIJK."

Next, the mobile telephone 30 decrypts the encrypted access-permitted mobile telephone number tel (S322), reads its own mobile telephone number from its nonvolatile memory 348 (S323), and verifies the decrypted access-permitted mobile telephone number tel against its own mobile telephone number (S324). The service server 10 is accessed using the access information when both of the mobile telephone numbers match in the verification (S325). At this time, the mobile telephone 30 transmits the plain text URL and the encrypted image identification information id to the service server 10. It is not necessary for transmitting the encrypted access-permitted mobile telephone number tel to the service server 10, but it is preferably to transmit the entire body of read access information for being verified against the original access information on the side of the service server 10.

Next, the service server 10 having received the encrypted image identification information id from the mobile telephone 30 decrypts the encrypted image identification information id (S326). The additional information of the image (such as sound information, text information, shooting location information, and the like) corresponding to the decrypted image identification information id is then retrieved from the database 103m and transmitted to the access origin mobile telephone 30 via the network 60 (S327).

Then, the additional information transmitted to the access origin mobile telephone 30 is outputted by the mobile telephone 30 (S328).

Selection of Delivery Mode

In the service system according to the first to third embodiments described above, the target audience who is to receive a contents delivery service is as following: (1) one specified person; (2) a specified plurality of people; and (3) an unspecified plurality of people.

In other words, even if one or a plurality of photographic prints recorded with the same two-dimensional barcode is transferred to an unspecified plurality of people, it is possible for the user ordering the print (the ordering user) to select a desired delivery mode from the following three modes: a first delivery mode which restricts the delivery service in such a manner that only one specific person can receive the contents delivery service; a second delivery mode which restricts the delivery service in such a manner that only a specified plurality of people can receive the contents delivery service; and a third delivery mode in which an unspecified plurality of people can receive the contents delivery service.

Figure 7:
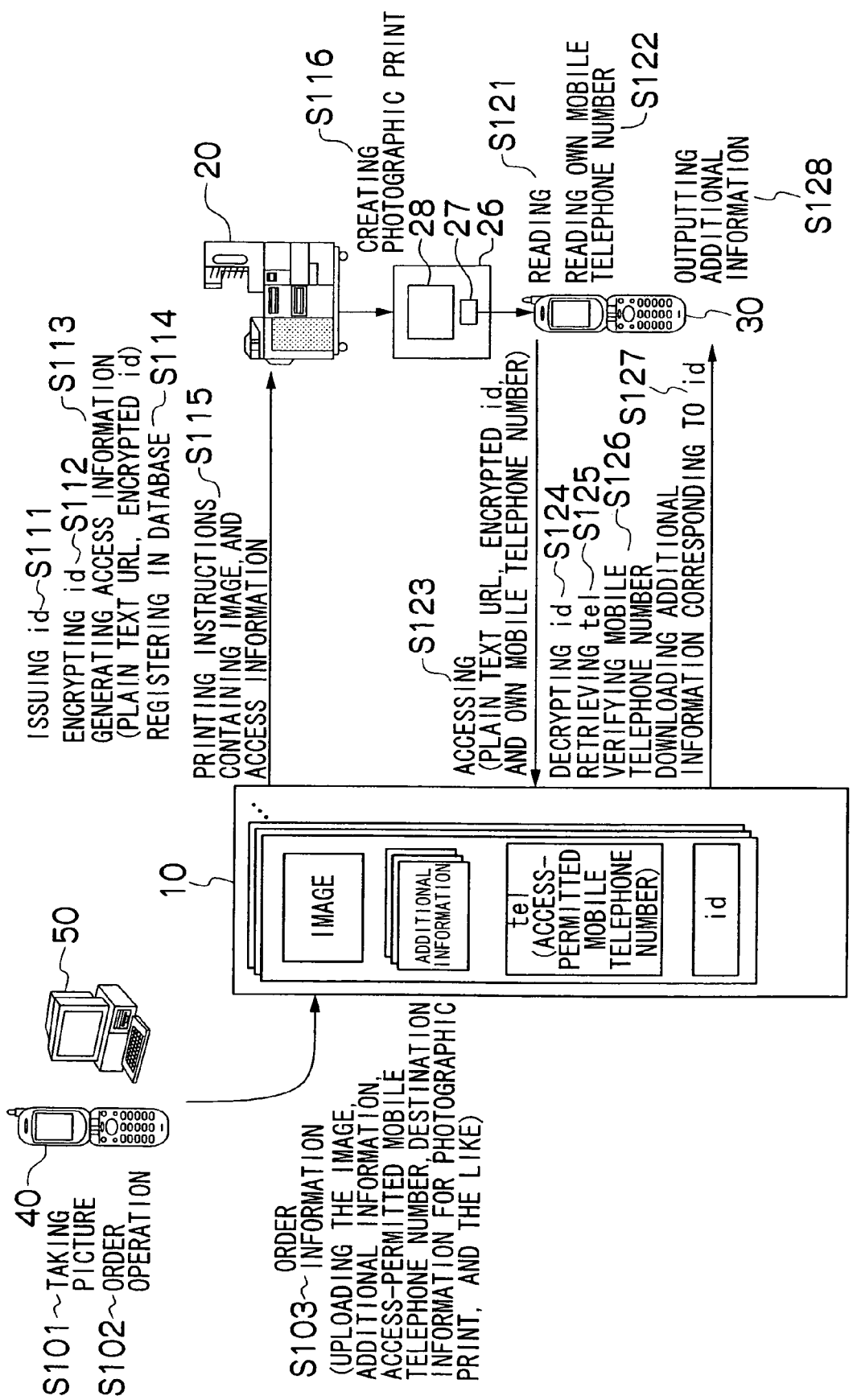
FIG. 7 is a diagram showing a sequence of service processing according to the first embodiment.

More specifically, when the ordering user inputs a delivery mode instruction to user's own mobile telephone 40 (S102 in FIG. 7, S202 in FIG. 9, and S302 in FIG. 11), the delivery mode instruction information indicating the delivery mode specified by the ordering user is sent from the mobile telephone 40 to the service server 10 as a part of the order information (S103 in FIG. 7, S203 in FIG. 9, and S304 in FIG. 11). Such the delivery mode instruction information is received by the order information receiving device (referred to as 101a in FIG. 6, 102a in FIG. 8, and 103a in FIG. 10) of the service server 10, and is registered in the database (referred to as 101m in FIG. 6, 102m in FIG. 8, and 103m in FIG. 10) in association with the image identification information id, as part of the order information, by the registering device (referred to as 101f in FIG. 6, 102f in FIG. 8, and 103f in FIG. 10).

The above second delivery mode in which delivery is provided to a specified plurality of people will be described below. The second delivery mode is approximately the same in principle as the first delivery mode, and the first delivery mode has already been described. Therefore, only those points which differ from the first delivery mode are described here.

First, the second delivery mode is described in the case of the service system according to the first embodiment shown in FIG. 6 and FIG. 7.

The registering device 101f of the service server 10 registers the image identification information id and the mobile telephone number list in a mutually associated manner, in the database 101m (S114 in FIG. 7). Herein, the mobile telephone number list comprises the telephone numbers, tel, of a plurality of access-permitted mobile telephones. In other words, the access information includes a list in which a plurality of access-permitted mobile telephone numbers tel are associated with one image identification information id.

For example, it is supposed that the ordering user has ordered a plurality of photographic prints 26 having the same image 28 and the same two-dimensional barcode 27. Herein, when the ordering user has input at the ordering user's mobile telephone 40 the mobile telephone numbers of a plurality of members who are to be recipients of delivery of the photographic print, the mobile telephone numbers of this plurality of members are registered in the database 101m as a mobile telephone number list. For example, as shown in FIG. 12, three access-permitted mobile telephone numbers (tel=X, Y, Z) are registered in database 101*m* in association with one sound id=A.

When a member having received the photographic print reads the two-dimensional barcode 27 on the photographic print 26 into the member's mobile telephone 30 (S121 in FIG. 7), access information is sent from the mobile telephone 30 to the service server 10, and this access information is received by the access information receiving device 101*g* of the service server 10 (S123 in FIG. 7).

The decrypting device 101*h* of the service server 10 decrypts the encrypted text of the image identification information id contained in the access information (S124 in FIG. 7).

The retrieving device 101*i* of the service server 10 retrieves the database 101*m* for the list corresponding to the image identification information id obtained from the mobile telephone 30 (S125 in FIG. 7).

The verifying device 101*j* of the service server 10 judges whether or not the telephone number received from the mobile telephone 30 is contained in the access-permitted mobile telephone numbers contained in the list found by the retrieving device 101*i* (S126 in FIG. 7).

The transmitting device 101*k* of the service server 10 delivers the additional information corresponding to the image identification information id, to the mobile telephone 30, only in cases where the telephone number obtained from the mobile telephone 30 is contained in the list as an access-permitted mobile telephone number (S127 in FIG. 7).

For example, as shown in FIG. 12, it is supposed that the same two-dimensional barcode 27 on the photographic print 26 has been read in to the mobile telephone 30X of a first user assigned with the telephone number X, the mobile telephone 30Y of a second user assigned with the telephone number Y, and the mobile telephone 30Z of a third user assigned with the telephone number Z. Since the sound id=A identifying the sound information forming delivery information is contained in encrypted form in the two-dimensional barcode of the photographic print 26, then access information containing the sound id=A and telephone number X is sent from the first user's mobile telephone 30X to the service server 10, access information containing the sound id=A and the telephone number Y is sent from the second user's mobile telephone 30Y to the service server 10, and access information containing the sound id=A and the telephone number Z is sent from the third user's mobile telephone 30Z to the service server 10. Three access-permitted mobile telephone numbers (tel=X, Y, Z) are registered in the database 101*m* in association with one sound id=A. Therefore, sound information corresponding to sound id=A is delivered from the service server 10 to the three mobile telephones 30X, 30Y and 30Z.

On the other hand, when the two-dimensional barcode 27 on the photographic print 26 is read in to the mobile telephone 30P of a fourth user assigned with the telephone number P, the telephone number P is not registered in the database 101*m* in association with the sound id=A. Therefore, access is denied to the fourth user's mobile telephone 30P.

Next, a second delivery mode is described in the case of the service system according to the second embodiment illustrated in FIG. 8 and FIG. 9.

The access information generating device 102*d* of the service server 10 generates access information containing encrypted image identification information id and an encrypted mobile telephone number list (S213 in FIG. 9).

Herein, the mobile telephone number list comprises the telephone numbers tel of a plurality of access-permitted mobile telephones. In other words, the access information includes a list in which a plurality of access-permitted mobile telephone numbers, tel, are associated with one image identification information id.

The print instruction information creating device 102*e* of the service server 10 creates instruction information which causes access information to be recorded onto the print medium together with the image (S215 in FIG. 9). Thereupon, the printer 20 forms a photographic print 26 in which the access information is recorded in the form of a two-dimensional barcode 27 (S216 in FIG. 9).

When a member who has received the photographic print 26 reads the two-dimensional barcode 27 on the photographic print 26 into the member's mobile telephone 30 (S221 in FIG. 9), the mobile telephone 30 reads out its own mobile telephone number from the non-volatile memory 348 of the mobile telephone 30 (S222 in FIG. 9). Then, the mobile telephone number adds to the access information, and sends to the service server 10 (S223 in FIG. 9).

The decrypting device 102*h* of the service server 10 decrypts the encrypted text of the image identification information id and the encrypted text of the mobile telephone number list contained in the access information (S224 in FIG. 9).

The verifying device 102*j* of the service server 10 judges whether or not the mobile telephone number obtained from the mobile telephone 30, which is the mobile telephone number stored in advance in that mobile telephone 30, is contained in the mobile telephone number list, which is recorded in encrypted form on the photographic print 26, obtained from the mobile telephone 30, (S226 in FIG. 9).

The transmitting device 102*k* of the service server 10 delivers to the mobile telephone 30 the additional information corresponding to the image identification information id, only in a case where the telephone number obtained from the mobile telephone 30 is contained in the list as an access-permitted mobile telephone number (S227 in FIG. 9).

Next, the second delivery mode is described in the case of the service system according to the third embodiment illustrated in FIG. 10 and FIG. 11.

The access information generating device 103*d* of the service server 10 generates access information containing encrypted image identification information id and an encrypted mobile telephone number list (S313 in FIG. 11). The print instruction information creating device 103*e* of the service server 10 creates instruction information which causes access information to be recorded onto the print medium together with the image (S315 in FIG. 11). Thereupon, the printer 20 forms a photographic print 26 in which the access information is recorded in the form of a two-dimensional barcode 27 (S316 in FIG. 11).

When a member who has received the photographic print reads the two-dimensional barcode 27 on the photographic print 26 into the member's mobile telephone 30 (S321 in FIG. 11), the decrypting device 303*h* of the mobile telephone 30 decrypts the encrypted text of the mobile telephone number list contained in the access information (S322 in FIG. 11). In addition, the verifying device 303*h* of the mobile telephone 30 reads out the mobile telephone number of that mobile telephone from the non-volatile memory 348 of the mobile telephone 30 (S323 in FIG. 11), and judges whether or not the telephone number of that mobile telephone is contained in the mobile telephone number list (S324 in FIG. 11).

Only if a telephone number of the mobile telephone is contained in the mobile telephone number list, the access control device 303 of the mobile telephone 30 performs control to access the service server (S325 in FIG. 11). If a telephone number of the mobile telephone is not contained in the mobile telephone number list, a screen indicating denial of access is displayed on the LCD 344 of the mobile telephone 30.

Figure 13A:
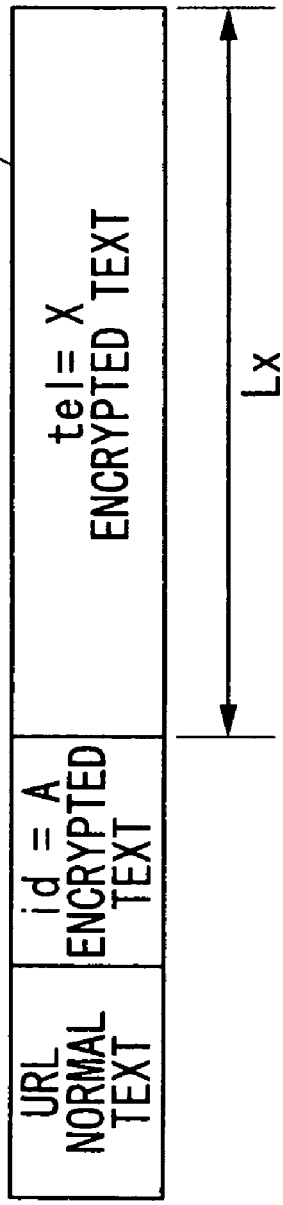
FIG. 13A is a plan view showing an example of access information containing one access-permitted mobile telephone number.
Figure 13B:
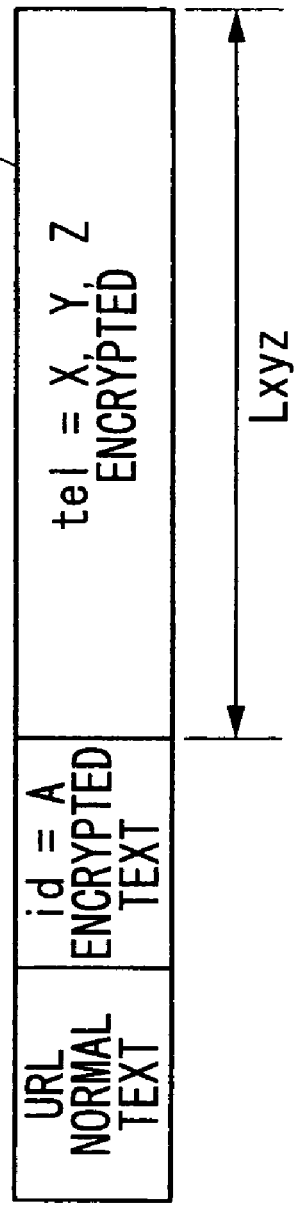
FIG. 13B is a plan view showing another example of access information containing a plurality of access-permitted mobile telephone numbers.

FIG. 13A shows access information having one access-permitted mobile telephone number tel. More specifically, a mobile telephone number list 2731 comprising one mobile telephone number tel=x is associated with the image identification information id=A and encrypted. FIG. 13B, on the other hand, shows access information having a plurality of access-permitted mobile telephone numbers, tel. More specifically, a mobile telephone number list 2732 comprising three mobile telephone numbers tel=X, Y, Z is associated with the image identification information id=A and encrypted.

Herein, the data length $L_x$ of the mobile telephone number list 2731 shown in FIG. 13A is same as the data length $L_{xyz}$ of the mobile telephone number list 2732 shown in FIG. 13B. More specifically, the encrypting device 102c of the service server 10 encrypts the mobile telephone number list in such a manner that the encrypted data length is uniform. Therefore, a third party is not able to identify the telephone numbers of the members, and neither is a third party able to identify how many members there are, even if the member attempts to read the two-dimensional barcode on the photographic print into his or her mobile telephone by a normal method.

Additional Registration of Terminal Identifiers

As described above, in the delivery mode where delivery of contents is restricted to one specified person or a plurality of specified people, if the two-dimensional barcode on the photographic print is read in to a mobile telephone having a telephone number forming a terminal identifier that is not registered, access to the service server 10 from that mobile telephone is denied in principle in relation to contents delivery, in principle. This denial of access is necessary for preventing unauthorized access by a third party.

Furthermore, there is a case that a mobile telephone is not able to read in the two-dimensional barcode on the photographic print, even if the telephone number forming the terminal identifier of that mobile telephone has been registered. For example, there is a case that a QR code (registered trademark) forming a two-dimensional barcode has been recorded, but the user's mobile telephone is not compatible with QR codes.

Therefore, the service server 10 according to the first embodiment described above judges whether or not specified conditions are matched, and it additionally registers the telephone number of the mobile telephone of a user who is newly seeking access permission when those specified conditions are matched.

More specifically, provided that a specified person gives the person's consent, the telephone number of a user newly seeking access permission is registered additionally, and that user is permitted access. In a first example, there is a mode that access is permitted after seeking consent for access permission from the ordering user. In a second example, there is a mode that access is permitted after seeking consent for access permission from a member of the group.

Figure 14:
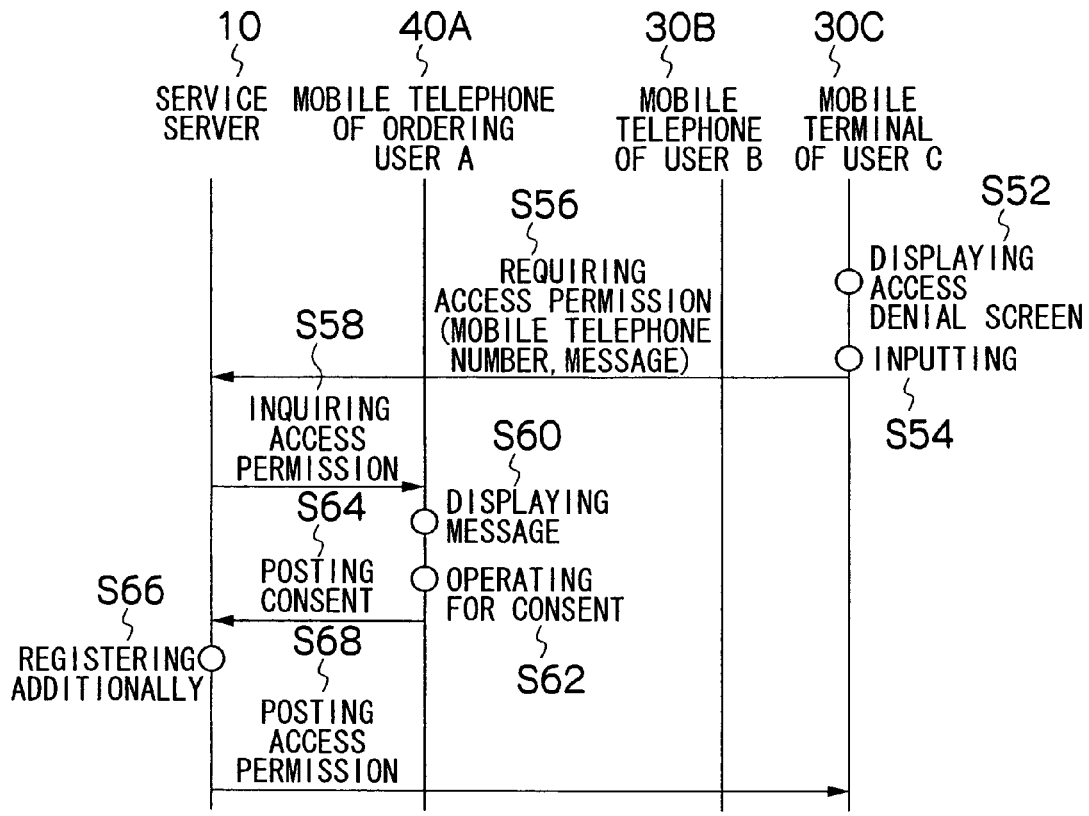
FIG. 14 is a diagram showing a sequence of processing when access permission is sought from an ordering user.

FIG. 14 is a diagram showing a sequence of processing when consent for access permission is sought from the ordering user A.

In FIG. 14, it is supposed that the telephone number of a mobile telephone 30B belonging to user B has been previously registered in the database of the service server 10, while the telephone number of the mobile telephone 30C belonging to user C has not been registered in the database of the service server 10. In addition, it is supposed that the mobile telephone 30B of user B does not have a function for reading in the two-dimensional barcode 27 on the photographic print 26 shown in FIG. 4.

Furthermore, it is also supposed that user B has read in the two-dimensional barcode 27 on the photographic print 26 to the mobile telephone 30C of user C, who is a friend of the user B. In this case, an access denial screen 3441 as shown in FIG. 15 is displayed on the mobile telephone 30C of user C (S52).

Figure 15:
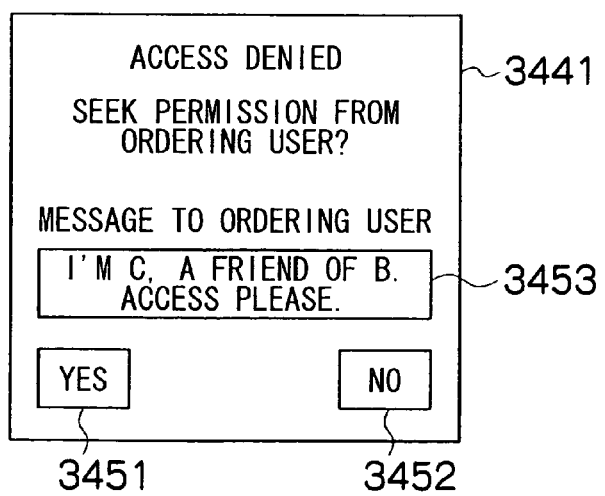
FIG. 15 is a plan view of an access denial screen when access permission is sought from the ordering user.

The access denial screen 3441 in FIG. 15 contains a message input field 3453 in which a message to the ordering user A is input, a "Yes" button 3451 and a "No" button 3452.

At the mobile telephone 30C of user C, when a message to the ordering user A is input to the message input field 3453, and the "Yes" button 3451 is clicked (S54), the telephone number of mobile telephone 30C of user C and the message are sent from the mobile telephone 30C of user C to the service server 10 (S56). Then, the service server 10 presents an enquiry for access permission attached with the message, to the mobile telephone 40A of the ordering user A (S58). This inquiry may be made by using electronic mail. The message addressed to the ordering user A input at the mobile telephone 30C of user C is displayed on the mobile telephone 40A of the ordering user A (S60).

When a prescribed consent operation is performed at the mobile telephone 40A of the ordering user A (S62), a consent report is transmitted from the mobile telephone 40A of the ordering user A to the service server 10 (S64). Then, the telephone number of mobile telephone 30C of user C is additionally registered in the database of the service server 10 as an access-permitted mobile telephone number (S66), and an access permission report is sent from the service server 10 to the mobile telephone 30C of user C (S68).

As described previously, the telephone number of mobile telephone 30C of user C is registered in the database in association with the image on the photographic print and the contents corresponding to this image. For example, when access information is received from the mobile telephone 30C of user C for the first time, an association is created between the telephone numbers, the image and the contents, by using the image identification information id (also referred to as "contents identification information") contained in the access information.

Thereafter, when the two-dimensional barcode 27 on the photographic print 26 is read in to the mobile telephone 30C of user C, the access information is sent from the mobile telephone 30C of user C to the service server 10, the additional information relating to the image on the photographic print 26 is sent from the service server 10 to the mobile telephone 30C of user C, and then this additional information is reproduced in mobile telephone 30C of user C.

Figure 16:
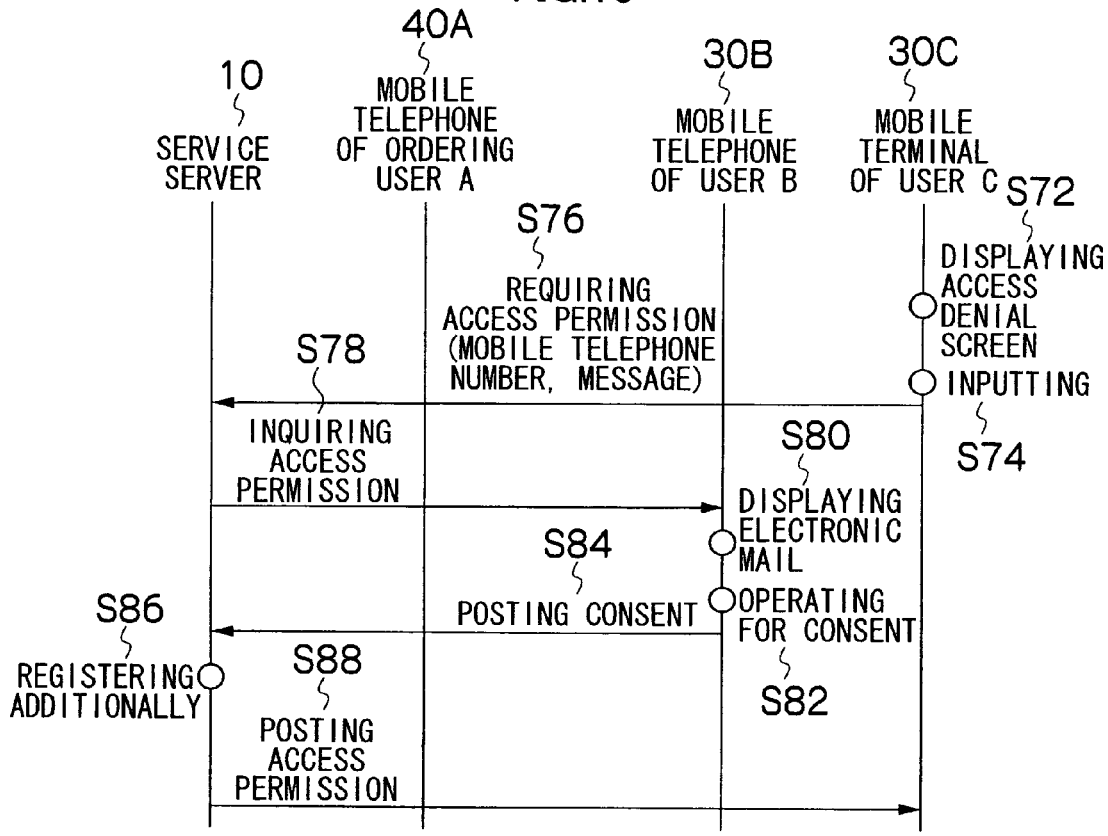
FIG. 16 is a diagram showing a sequence of processing when access permission is sought from a group member.

FIG. 16 is a diagram showing a sequence of processing when consents for access permission is sought from a member of the group.

In FIG. 16, it is supposed that the telephone number of a mobile telephone 30B belonging to user B has been previously registered in the database of the service server 10, while the telephone number of the mobile telephone 30C belonging to user C has not been registered in the database of the service server 10. In addition, it is supposed that the mobile telephone 30B of user B does not have a function for reading in the two-dimensional barcode 27 on the photographic print 26 shown in FIG. 4.

Furthermore, it is also supposed that user B has read in the two-dimensional barcode 27 on the photographic print 26 to the mobile telephone 30C of user C, who is a friend of the user B. In this case, an access denial screen 3442 as illustrated in FIG. 17 is displayed on the mobile telephone 30C of user C (S72).

Figure 17:
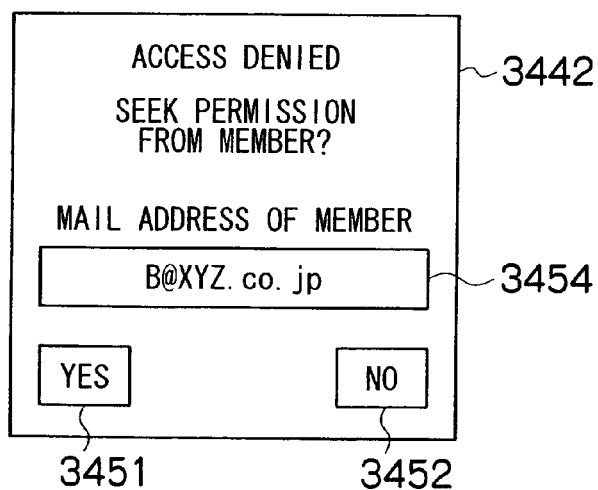
FIG. 17 is a plan view of an access denial screen when access permission is sought from a group member.

The access denial screen 3442 in FIG. 17 contains a mail address input field 3454 in which the mail address of a member is input, a "Yes" button 3451 and a "No" button 3452. Herein, the mail address of user B is input to the mail address input field 3454, and the "Yes" button 3451 is clicked (S74). Thereby, the telephone number and mail address of the mobile telephone 30C of user C are sent from the mobile telephone 30C of user C to the service server 10 (S76). When the mail address has been registered previously in the database of the service server 10, an access permission inquiry is made from the service server 10 to the mobile telephone 30B of user B (S78). For example, an inquiry of this kind is performed if the ordering user A has previously registered the mail address of user B. Furthermore, it is also possible for user B to register the mail address by using the mobile telephone 30B of user B.

When the electronic mail is opened on the mobile telephone 30B of user B, the contents of the electronic mail containing an access permission inquiry is displayed on the mobile telephone 30B of user B (S80). Herein, if a prescribed consent operation is performed at the mobile telephone 30B of user B (S82), a consent report is transmitted from the mobile telephone 40A of the ordering user A to the service server 10 (S84). Then, while the telephone number of mobile telephone 30C of user C is registered in the database of the service server 10 as an access-permitted mobile telephone number (S86), an access permission report is sent from the service server 10 to the mobile telephone 30C of user C (S88). Furthermore, the telephone number of mobile telephone 30C of user C is registered in the database in association with the image on the photographic print and the contents corresponding to this image, as described previously.

Thereafter, when the two-dimensional barcode 27 on the photographic print 26 is read in to the mobile telephone 30C of user C, the access information is sent from the mobile telephone 30C of user C to the service server 10, the additional information relating to the image on the photographic print 26 is sent from the service server 10 to the mobile telephone 30C of user C, and this additional information is reproduced in the mobile telephone 30C of user C.

Incidentally, an example is described in which an access permission inquiry is made only to the mobile telephone 30B of user B, but the invention is not limited in particular to cases of this kind, and it is also possible for an access permission inquiry to be made to all of the members who have already been granted access permission.

In addition, the description is divided into the first example in which an access permission inquiry is made to the mobile telephone of the ordering user, and the second example in which an access permission inquiry is made to the mobile telephones of members who have access permission, but the invention is not limited in particular to these cases, and it is also possible for an access permission inquiry to be made to both the ordering user and the members who have already been granted access permission.

Furthermore, the description related to an access permission request in the case of the service system according to the first embodiment only, but may also be performed in the case according to the second and third embodiments.

More specifically, the access control device of the mobile telephone 30 sends an access permission request to the service server 10 when access has been denied by the service server 10. In addition, when the service server 10 has received an access permission request from the mobile telephone 30, access from that mobile telephone 30 is permitted, provided that consent of a specified person is granted. In this case, the mobile telephone number of the mobile telephone 30 is registered preferably in the database in association with the image identification information id.

Figure 5E:
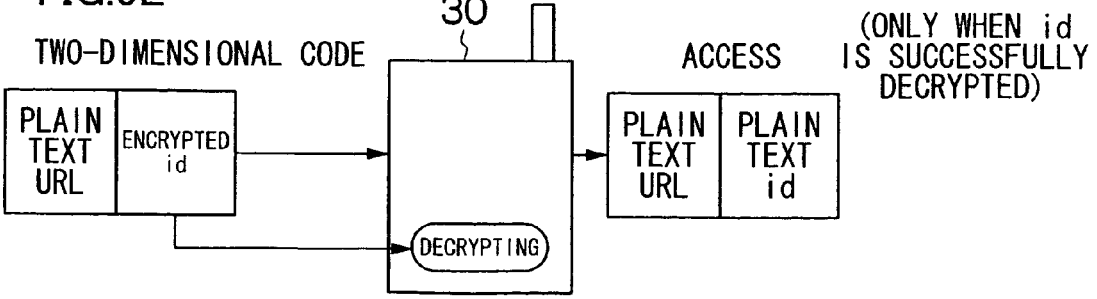

As described above, the embodiment is explained in a case in which the encrypted access-permitted mobile telephone number tel is recorded in the photographic print 26. However, in a case in which inclusion of the mobile telephone number even in encrypted form in the two-dimensional code is not permitted for security reasons, the encrypted access-permitted mobile telephone number tel may be incorporated into the two-dimensional code 27 as shown in FIG. 5E. In this case, the mobile telephone 30 which has read the two-dimensional code 27 accesses to the service server 10 if it has succeeded in decrypting the image identification information id, while the mobile telephone 30 dose not access to the service server 10 if the image identification information id has not been decrypted. Therefore, it becomes especially effective in the case in which mobile telephone numbers are changed frequently.

Moreover, according to the first through third embodiments described above, the URL contained in the access information is not limited to a communication protocol name and a server 10 domain name only, and may also include a file path or other information if it is allowed on security. In addition, the information added to the URL is not limited to encrypted image identification information id and an encrypted mobile telephone number tel, and other encrypted or plain text information may also be added thereto.

Furthermore, as described above, those embodiments is explained in the cases in which the access information is recorded on the photographic print 26 as a two-dimensional code is described above, but the present invention is not limited to those, and the access information may also be written into an IC tag formed in the paper. In this case, it is preferable to provide the printer 20 with a wireless writing device for writing the access information wirelessly in the IC tag (referred to as RFID (Radio Frequency Identification)). As the same time, it is preferable to provide the mobile telephone with a wireless reading device for reading the access information from the IC tag wirelessly.

The access information is embedded and recorded as a digital watermark in the image on the photographic print 26. In this case, the mobile telephone is provided with the capability of reading digital watermark information.

Additionally, the present invention is also not limited to a mobile telephone, and PDA (Personal Digital Assistants) and other communication terminals may also be adopted.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A server which provides at least one of an image and additional information of the image via a network to a mobile terminal of an access source when access is received from the mobile terminal via the network using access information recorded together with the image on a prescribed print medium, the sewer comprising:

an encrypting device which encrypts identification information corresponding to the image;

an access information generating device which generates the access information containing a plain text URL required for access to the sewer and the encrypted identification information;

a print instruction information creating device which creates instruction information that the access information is recorded together with the image onto a print medium by a prescribed printer;

a receiving device which receives the encrypted identification information contained in the access information from the mobile terminal when the access information recorded on the print medium is inputted to the mobile terminal;

a decrypting device which decrypts the encrypted identification information that is received; and a transmitting device which transmits at least one of the image and the additional information of the image that correspond to the decrypted identification information to the mobile terminal, wherein the access information is recorded as a two-dimensional code on the print medium, and wherein the encryption is provided by an encryption key of the server.

2. A mobile terminal operating with the server of claim 1, said mobile terminal accessing said server and receiving at least one of the image and the additional information reproduced from the server.

3. The mobile terminal as defined in claim 2, wherein the access control device requests access permission to the server if access has been denied by the server.

4. A server which provides at least one of an image and additional information of the image via a network to a mobile terminal of an access source when access is received from the mobile terminal via the network using access information recorded together with the image on a prescribed print medium, the server comprising:

a registering device which registers a terminal identifier of the mobile terminal having an access permission for each of images in association with identification information that corresponds to the image into a prescribed database;

an access information generating device which generates the access information containing an encrypted identification information and a plain text URL required for connecting to the server;

a print instruction information creating device which creates instruction information that the access information containing the plain text URL and the encrypted identification information is recorded together with the image onto a print medium by a prescribed printer;

a receiving device which receives the encrypted identification information and the terminal identifier stored in advance in the mobile terminal from the mobile terminal, when the access information recorded on the print medium is inputted to the mobile terminal;

a decrypting device which decrypts the encrypted identification information that is received;

a retrieving device which retrieves the terminal identifier that is associated with decrypted the identification information from the database;

a verifying device which verifies the retrieved terminal identifier against the terminal identifier received from the mobile terminal; and a transmitting device which transmits the at least one of image and the additional information of the image corresponding to the decrypted identification information to the mobile terminal if the verifying device verifies the retrieved terminal identifier against the terminal identifier received from the mobile terminal, and denies the access from the mobile terminal if the verifying device does not verify the retrieved terminal identifier against the terminal identifier received from the mobile terminal; and wherein:

the registering device registers in the database a list associating a plurality of terminal identifiers with one piece of identification information;

the retrieving device retrieves from the database the list corresponding to the identification information received from the mobile terminal;

the verifying device judges whether or not the terminal identifier received from the mobile terminal is contained in the list retrieved by the retrieving device; and the transmitting device transmits at least one of the image and the additional information to the mobile terminal only if the terminal identifier received from the mobile terminal is contained in the list, and wherein the access information is recorded as a two-dimensional code on the print medium, and wherein the encryption is provided by an encryption key of the server.

5. The server as defined in claim 4, wherein:

if the transmitting device denies the access from the mobile terminal, then the registering device performs a setting whereby access from the mobile terminal that has been denied the access is permitted, by registering in the database the terminal identifier of the mobile terminal in association with the identification information.

6. A mobile terminal operating with the server of claim 5, said mobile terminal accessing said server and receiving at least one of the image and the additional information reproduced from the server.

7. A mobile terminal operating with the server of claim 4, said mobile terminal accessing said server and receiving at least one of the image and the additional information reproduced from the server.

8. A server which provides at least one of an image and additional information of the image via a network to a mobile terminal of an access source when access is received from the mobile terminal via the network using access information recorded together with the image on a prescribed print medium, the server comprising:

an access information generating device which generates the access information containing a plain text URL required for access to the server and an encrypted terminal identifier of the mobile terminal that has an access permission for each of images;

a print instruction information creating device which creates instruction information whereby the access information thus generated is recorded by a prescribed printer together with the image onto a print medium;

a receiving device which receives the access information that includes the encrypted terminal identifier and the terminal identifier stored in advance in the mobile terminal from the mobile terminal, when the access information recorded on the print medium is inputted to the mobile terminal;

a decrypting device which decrypts the encrypted terminal identifier;

a verifying device which verifies the decrypted terminal identifier against the terminal identifier stored in advance in the mobile terminal;

a transmitting device which transmits at least one of the image and the additional information of the image to the mobile terminal according to the access information if the verifying device verifies the decrypted terminal identifier against the terminal identifier stored in advance in the mobile terminal, and denies access from the mobile terminal if the verifying device does not verify the decrypted terminal identifier against the terminal identifier stored in advance in the mobile terminal; and wherein:

the access information generating device generates access information containing a list which associates a plurality of terminal identifiers with one piece of identification information;

the print instruction information creating device creates instruction information whereby the access information containing the list is recorded onto the print medium together with the image;

the verifying device judges whether or not the terminal identifier received from the mobile terminal, which is the terminal identifier stored in advance in the mobile terminal, is contained in the list which is received from the mobile terminal and which has been recorded onto the print medium; and the transmitting device transmits at least one of the image and the additional information to the mobile terminal only if the terminal identifier stored in advance in the mobile terminal is contained in the list, and wherein the access information is recorded as a two-dimensional code on the print medium, and wherein the encryption is provided by an encryption key of the server.

9. A mobile terminal operating with the server of claim 8, said mobile terminal accessing said server and receiving at least one of the image and the additional information reproduced from the server.

10. A server which provides at least one of an image and additional information of the image via a network to a mobile terminal of an access source when access is received from the mobile terminal via the network using access information recorded together with the image on a prescribed print medium, the server comprising:

an access information generating device which generates the access information containing a plain text URL required for access to the server and an encrypted terminal identifier of the mobile terminal that has an access permission for each of images;

a print instruction information creating device which creates instruction information that the generated access information is recorded together with the image onto a print medium by a prescribed printer;

a receiving device which receives the access from the mobile terminal using the access information if the encrypted terminal identifier contained in the access information is decrypted by the mobile terminal, while the decrypted terminal identifier matches the terminal identifier stored in advance in the mobile terminal if the access information recorded on the print medium is inputted to the mobile terminal; and a transmitting device which transmits at least one of the image and the additional information of the image to the mobile terminal according to the access information; and wherein:

the access information generating device generates access information containing a list which associates a plurality of terminal identifiers with one piece of identification information;

the print instruction information creating device creates instruction information whereby the access information containing the list is recorded onto the print medium together with the image;

the receiving device receives the access information from the mobile terminal, if the terminal identifier stored in advance in the mobile terminal is contained in the list recorded on the print medium; and the transmitting device transmits at least one of the image and the additional information to the mobile terminal, if the access information is received from the mobile terminal, and wherein the access information is recorded as a two-dimensional code on the print medium, and wherein the encryption is provided by an encryption key of the server.

11. A mobile terminal operating with the server of claim 10, said mobile terminal accessing said server and receiving at least one of the image and the additional information reproduced from the server.

12. A mobile terminal which accesses a prescribed server via a network, using access information recorded together with an image onto a prescribed print medium, and which receives and reproduces at least one of the image and additional information of the image from the server; comprising:

an input device which inputs the access information containing a plain text URL required for access to the server and an encrypted text of a terminal identifier of the mobile terminal that access is permitted corresponding to the image;

a decrypting device which decrypts the encrypted text of the terminal identifier contained in the access information;

a storage device which stores the terminal identifier of the mobile terminal;

a verifying device which verifies the terminal identifier decrypted by the decrypting device against the terminal identifier stored in the storage device; and an access control device which performs control whereby the server is accessed by using the access information if the verifying device verifies the terminal identifier decrypted by the decrypting device against the terminal identifier stored in the storage device, while the server is not accessed if the verifying device does not verify the terminal identifier decrypted by the decrypting device against the terminal identifier stored in the storage device; and wherein:

the access information containing a list which associates a plurality of terminal identifiers with one piece of identification information is inputted to the input device;

the verifying device judges whether or not the terminal identifier stored in advance in the storage device is contained in the list; and the access control device performs control whereby the server is accessed only if the terminal identifier stored in advance in the storage device is contained in the list, and wherein the access information is recorded as a two-dimensional code on the print medium, and wherein the encryption is provided by an encryption key of the server.

13. The mobile terminal as defined in claim 12, wherein the access control device requests access permission to the server if access has been denied by the server.

14. A service method for providing at least one of an image and additional information of the image via a network from a server to a mobile terminal of an access source when the server is accessed from the mobile terminal via the network using access information recorded together with the image on a prescribed print medium; the service method comprising the steps of:

encrypting identification information corresponding to the image by the server;

generating by the server the access information which includes a plain text URL, which is required for access via the network, and the encrypted identification information;

recording the access information together with the image onto a print medium by a prescribed printer;

transmitting the encrypted identification information contained in the access information from the mobile terminal to the server when the access information recorded on the print medium is inputted to the mobile terminal;

decrypting the received encrypted identification information by the server; and transmitting at least one of the image and the additional information of the image, corresponding to the decrypted identification information to the mobile terminal by the server, and wherein the access information is recorded as a two-dimensional code on the print medium, and wherein the encryption is provided by an encryption key of the server.

15. A service method for providing at least one of an image and additional information of the image via a network from a server to a mobile terminal of an access source when the server is accessed from the mobile terminal via the network using access information recorded together with the image on a prescribed print medium, the service method comprising the steps of:

registering by the server a terminal identifier of the mobile terminal having an access permission for each of images in a prescribed database in association with identification information that corresponds to the image;

generating by the server the access information containing the encrypted identification information and a plain text URL required for connecting to the server;

recording the access information containing the plain text URL and the encrypted identification information together with the image onto a print medium by a prescribed printer;

transmitting the encrypted identification information and the terminal identifier stored in advance in the mobile terminal from the mobile terminal to the server when the access information recorded on the print medium is inputted to the mobile terminal;

decrypting by the server the received encrypted identification information;

retrieving by the server from the database the terminal identifier that is associated with the decrypted identification information;

verifying by the server the retrieved terminal identifier against the terminal identifier which is received from the mobile terminal; and transmitting by the server at least one of the image and the additional information of the image, corresponding to the decrypted identification information to the mobile terminal if the retrieved terminal identifier is verified against the terminal identifier which is received from the mobile terminal, and wherein the access information is recorded as a two-dimensional code on the print medium, and wherein the encryption is provided by an encryption key of the server.

16. A service method for providing at least one of an image and additional information of the image via a network from a server to a mobile terminal of an access source when the server is accessed from the mobile terminal via the network using access information recorded together with the image on a prescribed print medium, the service method comprising the steps of:

generating by the server the access information containing a plain text URL required for access to the server and an encrypted terminal identifier of the mobile terminal, that has an access permission for each of images;

recording the access information together with the image onto a print medium by a prescribed printer;

transmitting the access information which includes the encrypted terminal identifier and the terminal identifier, which is stored in advance in the mobile terminal from the mobile terminal to the server when the access information recorded on the print medium is inputted to the mobile terminal;

decrypting the encrypted terminal identifier by the server;

verifying by the server the decrypted terminal identifier against the terminal identifier which is stored in advance in the mobile terminal; and transmitting at least one of the image and the additional information of the image, according to the access information by the server to the mobile terminal if the decrypted terminal identifier is verified against the terminal identifier which is stored in advance in the mobile terminal, and wherein the access information is recorded as a two-dimensional code on the print medium, and wherein the encryption is provided by an encryption key of the server.

17. A service method for providing at least one of an image and additional information of the image via a network from a server to a mobile terminal of an access source when the server is accessed from the mobile terminal via the network using access information recorded together with the image on a prescribed print medium, the service method comprising the steps of:

generating by the server the access information containing a plain text URL required for access to the server and an encrypted terminal identifier of the mobile terminal that has an access permission for each of images;

recording the access information together with the image onto a print medium by a prescribed printer;

decrypting the encrypted terminal identifier contained in the access information by the mobile terminal when the access information recorded on the print medium is inputted to the mobile terminal;

verifying by the mobile terminal the decrypted terminal identifier against the terminal identifier which is stored in advance in the mobile terminal;

accessing from the mobile terminal to the server by using the access information if the decrypted terminal identifier is verified against the terminal identifier which is stored in advance in the mobile terminal; and transmitting by the server at least one of the image and the additional information of the image to the mobile terminal according to the access information, wherein the access information is recorded as a two-dimensional code on the print medium, and wherein the encryption is provided by an encryption key of the server.

* * * * *